United States Patent
Kishi et al.

(10) Patent No.: US 11,563,242 B2
(45) Date of Patent: Jan. 24, 2023

(54) MANAGEMENT METHOD, MANAGEMENT DEVICE, MANAGEMENT SYSTEM, BATTERY-MOUNTED APPARATUS, AND NON-TRANSITORY STORAGE MEDIUM

(71) Applicant: KABUSHIKI KAISHA TOSHIBA, Tokyo (JP)

(72) Inventors: Takashi Kishi, Osaka Osaka (JP); Taro Fukaya, Tokyo (JP); Kazuomi Yoshima, Yokohama Kanagawa (JP); Yasunobu Yamashita, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 62 days.

(21) Appl. No.: 17/186,050

(22) Filed: Feb. 26, 2021

(65) Prior Publication Data

US 2022/0077510 A1 Mar. 10, 2022

(30) Foreign Application Priority Data

Sep. 8, 2020 (JP) .............................. JP2020-150250

(51) Int. Cl.
*H01M 10/44* (2006.01)
*H02J 7/00* (2006.01)

(52) U.S. Cl.
CPC ............ *H01M 10/44* (2013.01); *H02J 7/005* (2020.01); *H02J 7/007* (2013.01); *H02J 7/0071* (2020.01); *H02J 7/00714* (2020.01); *H02J 7/007182* (2020.01)

(58) Field of Classification Search
CPC .......... H02J 7/005; H02J 7/007; H02J 7/0071; H02J 7/00714; H02J 7/007182; H01M 10/44

USPC ................................. 320/128, 132, 134, 157
See application file for complete search history.

(56) References Cited

U.S. PATENT DOCUMENTS

| | | | |
|---|---|---|---|
| 2009/0104510 A1 | 4/2009 | Fulop | |
| 2011/0059366 A1* | 3/2011 | Eom | H01M 4/485 |
| | | | 429/231.95 |
| 2011/0298417 A1* | 12/2011 | Stewart | G01R 31/52 |
| | | | 320/132 |
| 2014/0184165 A1* | 7/2014 | Takahashi | H01M 10/486 |
| | | | 429/90 |

(Continued)

FOREIGN PATENT DOCUMENTS

| | | |
|---|---|---|
| JP | 2007-181263 A | 7/2007 |
| JP | 2014-096376 A | 5/2014 |

(Continued)

*Primary Examiner* — Edward Tso
*Assistant Examiner* — Aaron Piggush
(74) *Attorney, Agent, or Firm* — Foley & Lardner LLP

(57) ABSTRACT

According to a management method in an embodiment, in charging of a battery in each of a constant current mode and a constant power mode, it is determined that the battery is unusable based on a voltage of the battery dropping by a voltage threshold value or more from a starting time of dropping without increasing again to a voltage value at the starting time of dropping. In the management method, in charging of the battery in a constant voltage mode, it is determined that the battery is unusable based on a current supplied to the battery increasing by a current threshold value or more from a starting time of increasing without dropping again to a current value at the starting time of increasing.

9 Claims, 7 Drawing Sheets

(56) References Cited

U.S. PATENT DOCUMENTS

| | | | |
|---|---|---|---|
| 2015/0039255 A1* | 2/2015 | Stewart | H01M 10/482 702/63 |
| 2019/0288348 A1 | 9/2019 | Fukaya | |
| 2021/0075225 A1 | 3/2021 | Fukaya et al. | |
| 2021/0111568 A1* | 4/2021 | Cho | H02J 7/0031 |

FOREIGN PATENT DOCUMENTS

| | | |
|---|---|---|
| JP | 2019-164975 A | 9/2019 |
| JP | 2021-044161 A | 3/2021 |

* cited by examiner

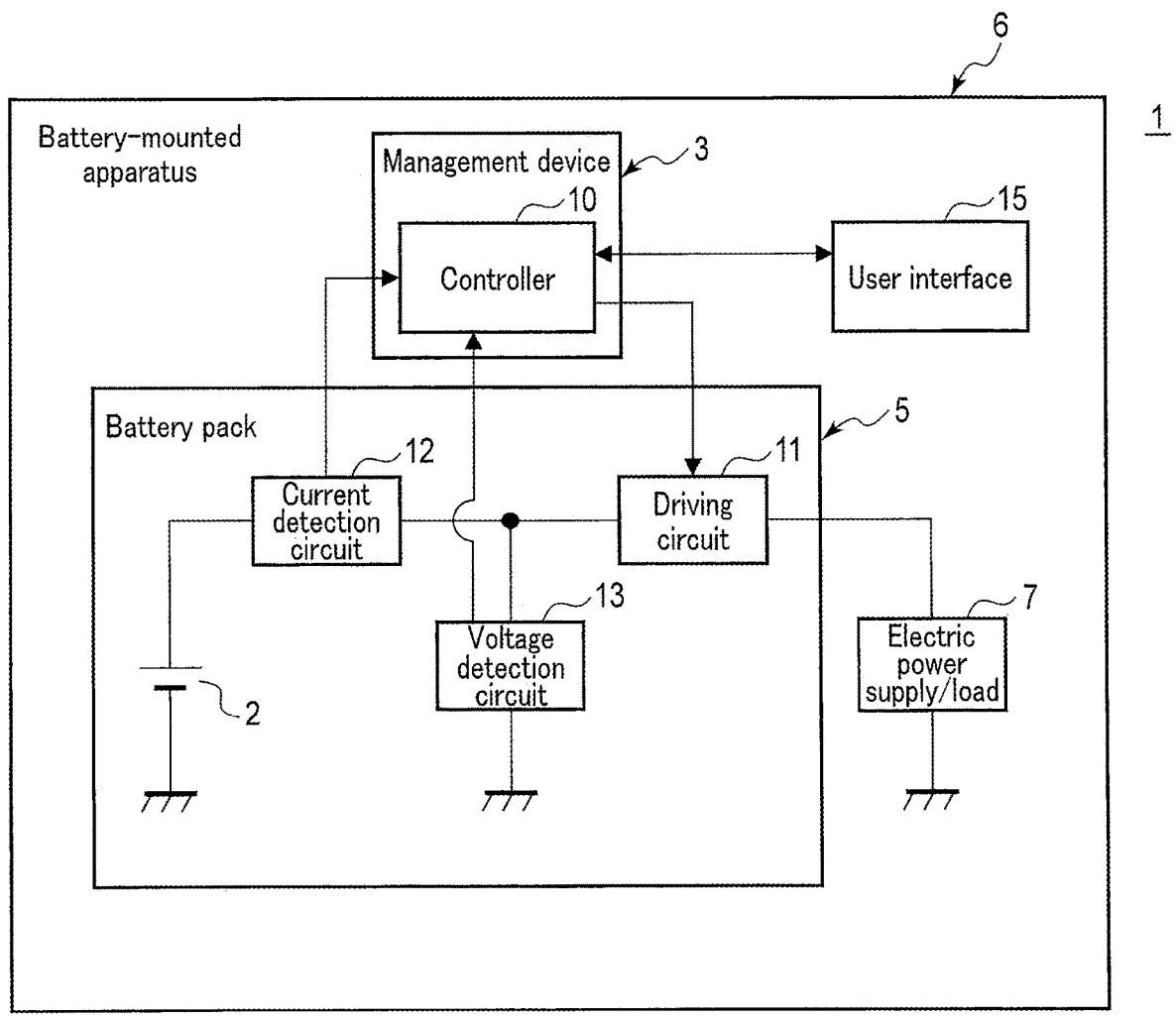
F I G. 1

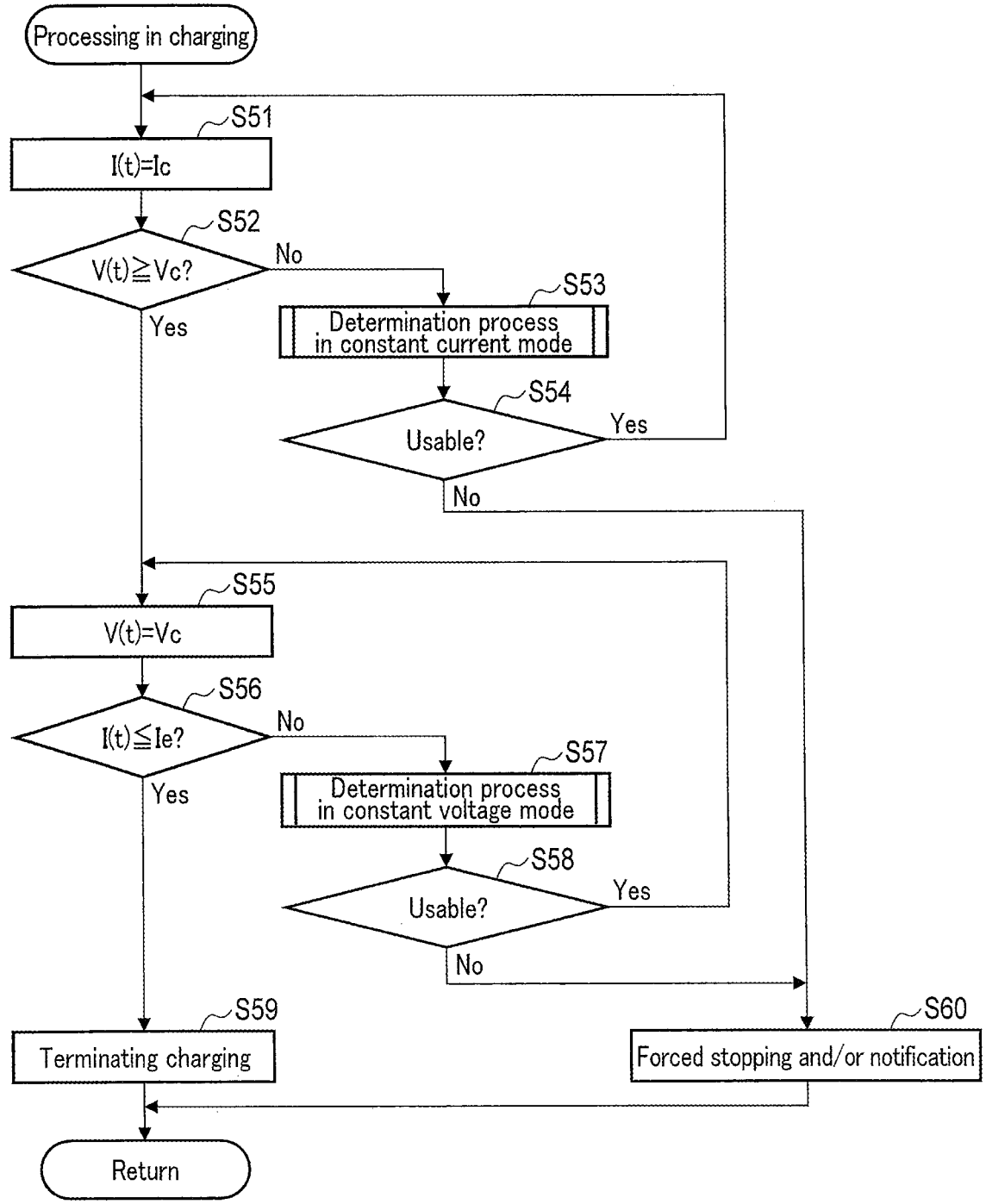
F I G. 3

MANAGEMENT METHOD, MANAGEMENT DEVICE, MANAGEMENT SYSTEM, BATTERY-MOUNTED APPARATUS, AND NON-TRANSITORY STORAGE MEDIUM

CROSS-REFERENCE TO RELATED APPLICATIONS

This application is based upon and claims the benefit of priority from Japanese Patent Application No. 2020-150250, filed Sep. 8, 2020; the entire contents of which are incorporated herein by reference.

FIELD

Embodiments described herein relate generally to a management method, a management device, a management system, a battery-mounted apparatus, and a non-transitory storage medium.

BACKGROUND

In recent years, a battery such as a lithium ion battery has been mounted in battery-mounted apparatuses, such as smartphones, vehicles, stationary electric power supply devices, robots and drones. In particular, to enable rapid charging and discharging in a short time, a battery in which an active material containing titanium is used as a negative electrode active material is used in the battery-mounted apparatus. Charging and discharging of such a battery is controlled by any one of a controller mounted in the battery-mounted apparatus, a control device separate from the battery-mounted apparatus, etc., thereby forming a management system that manages the battery by controlling the charging and discharging of the battery, etc.

One charging method of such a battery as described above is to, after charging the battery in a constant current mode in which a current supplied to the battery is held constant over time from a starting time of charging, switch to a constant voltage mode in which a voltage of the battery is held constant over time to charge the battery. In this charging method, the mode is switched to the constant voltage mode based on the voltage of the battery increasing to a reference voltage value in charging in the constant current mode. Then, in the charging in the constant voltage mode, the charging is terminated based on the current supplied to the battery dropping to a termination current value.

In a state where the charging is performed by the above-described charging method, when an abnormality making the battery unusable such as an occurrence of a short circuit in the battery occurs, the voltage of the battery may drop in the constant current mode, or the current supplied to the battery may increase in the constant voltage mode. On the other hand, also in a case where a change that restores a charging capacity of the battery such as an electrolytic solution being re-impregnated into an electrode group occurs in the battery, the voltage of the battery may drop in the constant current mode, or the current supplied to the battery may increase in the constant voltage mode. Thus, even in a state where the battery is continuously usable, the voltage of the battery may drop in the constant current mode, or the current supplied to the battery may increase in the constant voltage mode. Accordingly, it is required to properly determine whether each of the drop of the voltage of the battery in the constant current mode and the increase in current supplied to the battery in the constant voltage mode is attributed to an occurrence of an abnormality making the battery unusable. Namely, it is required to properly determine whether an abnormality making the battery unusable has occurred based on a temporal change in the current and voltage of the battery in charging of the battery.

BRIEF DESCRIPTION OF THE DRAWINGS

FIG. 1 is a schematic view showing an example of a management system according to an embodiment.

FIG. 3 is a flowchart showing an example of processing performed by a controller of a management device in charging of the battery according to the embodiment.

DETAILED DESCRIPTION

Figure 2:
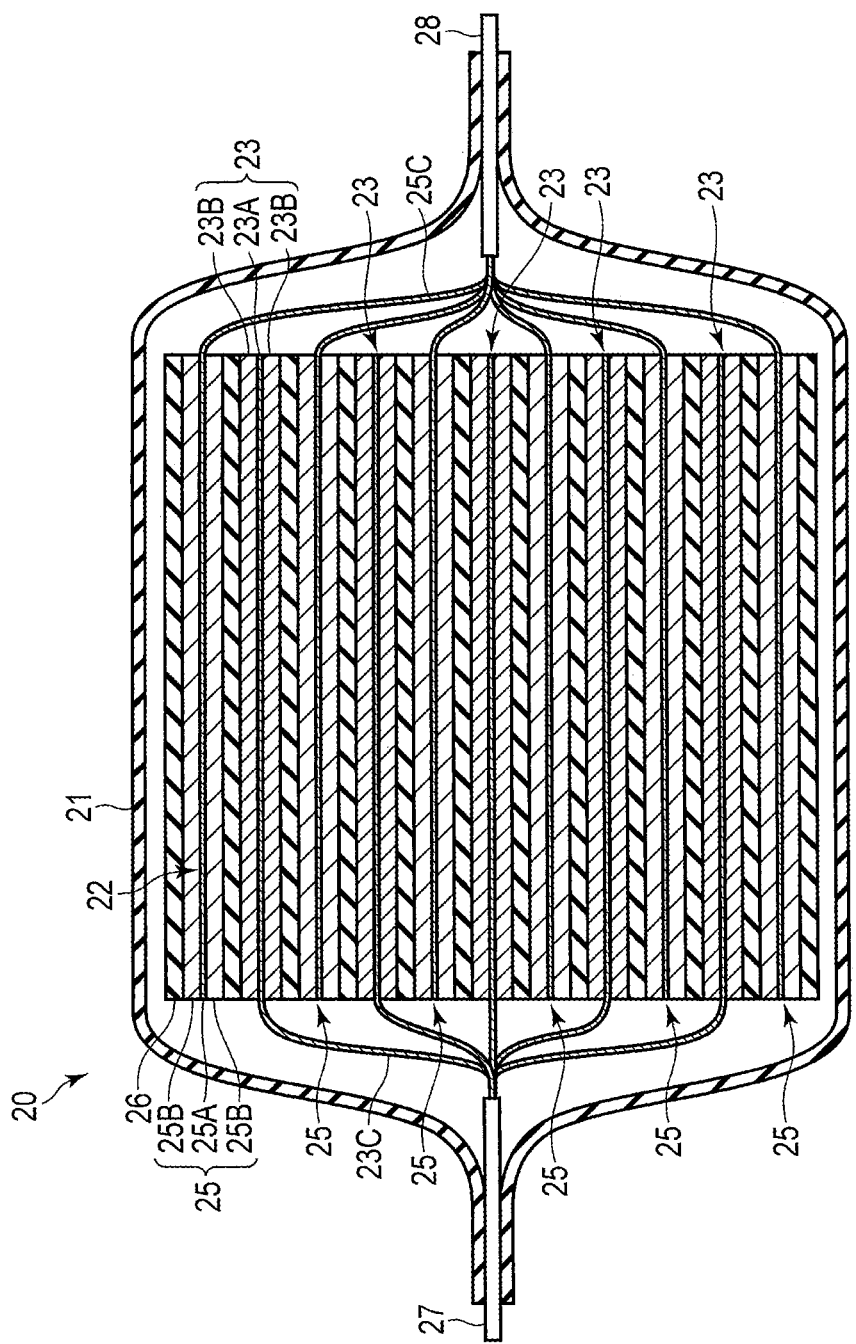
FIG. 2 is a schematic view showing an example of a single cell forming a battery according to the embodiment.

According to an embodiment, a management method of a battery in which an active material containing titanium is used as a negative electrode active material is provided. In the management method, in charging of a battery in each of a constant current mode in which a current supplied to the battery is held constant over time and a constant power mode in which electric power supplied to the battery is held constant over time, it is determined that the battery is unusable based on a voltage of the battery dropping by a voltage threshold value or more from a starting time of dropping without increasing again to a voltage value at the starting time of dropping. In the management method, in charging of the battery in a constant voltage mode in which a voltage of the battery is held constant over time, it is determined that the battery is unusable based on a current supplied to the battery increasing by a current threshold value or more from a starting time of increasing without dropping again to a current value at the starting time of increasing.

Embodiment

Hereinafter, an embodiment will be described with reference to the drawings.

FIG. 1 shows an example of a management system according to the embodiment. As shown in FIG. 1, a management system 1 includes a battery 2 and a management device 3. The battery 2 is mounted in a battery pack 5, and the battery pack 5 is mounted in battery-mounted apparatus 6. In the battery pack 5, the battery 2 is, for example, disposed in a state of being bound inside a housing (not shown). Examples of the battery-mounted apparatus 6 include a smart phone, a vehicle, a stationary electric power supply device, a robot, a drone, and examples of the vehicle as the battery-mounted apparatus 6 include an electric automobile, a plug-in hybrid electric automobile, and an electric motorcycle. In addition, an example of a robot in which the battery 2 is mounted is a transfer robot such as an automated guided vehicle (AGV) used in factories, etc.

The battery 2 may be a single cell (unit cell), or a cell block or a battery module in which a plurality of single cells are electrically connected. In a case where the battery 2 is a cell block or a battery module formed of a plurality of single cells, in the battery 2, at least one of an in-series connection structure in which a plurality of single cells are connected in series and an in-parallel connection structure in which a plurality of single cells are connected in parallel is formed. In addition, the battery 2 may be a storage battery in which a plurality of battery modules are electrically connected. In this case, in the battery 2, at least one of an in-series connection structure in which a plurality of battery modules are connected in series and an in-parallel connection structure in which a plurality of battery modules are connected in parallel is formed.

A single cell is, for example, a battery cell forming a lithium ion secondary battery. A single cell includes an electrode group, and the electrode group includes a positive electrode and a negative electrode. In the electrode group, a separator is interposed between the positive electrode and the negative electrode. The separator is made of a material having electrical insulation properties, and electrically insulates the positive electrode from the negative electrode. Examples of the separator include, but are not limited to, a porous film and a nonwoven fabric, etc., which are made of a synthetic resin. In addition, in the separator, a nonconductive particle layer may be formed on at least one surface of the porous film or nonwoven fabric, etc. Examples of the nonconductive particles include, but are not limited to, alumina, silica, zirconium, etc.

The positive electrode includes a positive electrode current collector such as a positive electrode current collecting foil, and a positive electrode active material-containing layer supported on a surface of the positive electrode current collector. The positive electrode current collector is made of a conductive metal. The positive electrode current collector is, but is not limited to, for example, an aluminum foil or an aluminum alloy foil, and has a thickness of about 10 μm to 30 μm. The positive electrode active material-containing layer includes a positive electrode active material, and may optionally contain a binder and an electro-conductive agent. Examples of the positive electrode active material include, but are not limited to, an oxide, a sulfide, and a polymer, which can occlude and release lithium ions. The positive electrode active material includes, for example, at least one selected from the group consisting of a manganese dioxide, an iron oxide, a copper oxide, a nickel oxide, a lithium-manganese composite oxide, a lithium-nickel composite oxide, a lithium-cobalt composite oxide, a lithium-nickel-cobalt composite oxide, a lithium-manganese-cobalt composite oxide, a nickel-cobalt-manganese composite oxide, a spinel-type lithium-manganese-nickel composite oxide, a lithium-phosphorus oxide having an olivine structure, an iron sulfate, and a vanadium oxide. As the electro-conductive agent, for example, one or more kinds of carbonaceous materials are used. As the binder, for example, a polymer resin is used.

In the positive electrode active material-containing layer, the mixing ratio of the positive electrode active material is preferably from 80% by mass to 95% by mass, the mixing ratio of the electro-conductive agent is preferably from 3% by mass to 18% by mass, and the mixing ratio of the binder is preferably from 2% by mass to 7% by mass. In formation of the positive electrode, a slurry is prepared by suspending the positive electrode active material, electro-conductive agent, and binder in an organic solvent, and the prepared slurry is applied on one or both surfaces of the positive electrode current collector. Then, by drying and press rolling the applied slurry, a positive electrode active material-containing layer supported on the one or both surfaces of the positive electrode current collector is formed. In addition, the positive electrode current collector includes a positive electrode current collecting tab as a portion not supporting the positive electrode active material-containing layer.

The negative electrode includes a negative electrode current collector such as a negative electrode current collecting foil, and a negative electrode active material-containing layer supported on a surface of the negative electrode current collector. The negative electrode current collector is made of a conductive metal. The negative electrode current collector is, but is not limited to, for example, an aluminum foil or an aluminum alloy foil, and has a thickness of about 10 μm to 30 μm. The negative electrode active material-containing layer may include a negative electrode active material, and may optionally contain a binder and an electro-conductive agent. Examples of the negative electrode active material include, but are not limited to, an active material which can occlude and release lithium ions and contains titanium, etc. Examples of the active material containing titanium include a titanium-containing oxide. Then, examples of the titanium-containing oxide to be the negative electrode active material include, for example, a titanium oxide, a lithium titanium-containing composite oxide, a niobium titanium-containing composite oxide, and a sodium niobium titanium-containing composite oxide. The active material containing titanium such as a titanium-containing oxide is used as the negative electrode active material so that an operating electric potential of the negative electrode active material is increased to be, e.g., 0.4 V (vs. Li/Li$^+$) or more. Thus, an operating electric potential of the negative electrode is increased. Examples of the electro-conductive agent and the binder of the negative electrode active material-containing layer include the same materials as those of the electro-conductive agent and the binder of the positive electrode active material-containing layer.

In the negative electrode active material-containing layer, the mixing ratio of the negative electrode active material is preferably from 80% by mass to 95% by mass, the mixing ratio of the electro-conductive agent is preferably from 3% by mass to 18% by mass, and the mixing ratio of the binder is preferably from 2% by mass to 7% by mass. In formation of the negative electrode, the negative electrode active material-containing layer supported on one or both surfaces of the negative electrode current collector is formed in the same manner as in the formation of the positive electrode. In addition, the negative electrode current collector includes a negative electrode current collecting tab as a portion not supporting the negative electrode active material-containing layer.

In the electrode group, for example, the positive electrode, negative electrode, and separator are wound around a winding axis with the separator sandwiched between the positive electrode active material-containing layer and the negative electrode active material-containing layer, and the electrode group has a wound structure. In another example, the electrode group has a stack structure in which a plurality of positive electrodes and a plurality of negative electrodes are alternately stacked, and a separator is provided between the positive electrode and the negative electrode.

In the single cell, the electrode group holds (is impregnated with) an electrolytic solution. The electrolytic solution may be a nonaqueous electrolytic solution obtained by dissolving an electrolyte in an organic solvent, or an aqueous electrolytic solution such as an aqueous solution obtained by dissolving an electrolyte in an aqueous solvent. As an electrolyte to be dissolved in an organic solvent, for example, a kind of lithium salt, or a mixture obtained by mixing two or more kinds of lithium salt, is used. In place of the electrolytic solution, a gel electrolyte which is a composite of an electrolytic solution and a polymeric material may be used. In place of, or in addition to, the electrolytic solution, a solid electrolyte may be used. If a solid electrolyte is used as an electrolyte, the solid electrolyte may be interposed between the positive electrode and the negative electrode in place of the separator in the electrode group. In this case, the positive electrode is electrically insulated from the negative electrode by the solid electrolyte.

In the single cell, the electrode group is housed inside a container member. As the container member, any one of a bag-shaped container made of a laminate film and a metal container can be used. Examples of the laminate film include a multilayer film including a plurality of resin layers and a metal layer interposed between the resin layers. The thickness of the laminate film is preferably 0.5 mm or less, and more preferably 0.2 mm or less. The metal container is preferably formed of, for example, at least a kind of metal selected from the group consisting of aluminum, zinc, titanium, and iron, or an alloy thereof. The wall thickness of the metal container is preferably 0.5 mm or less, and more preferably 0.2 mm or less.

In addition, the single cell includes a pair of electrode terminals. One of the electrode terminals is a positive electrode terminal electrically connected to the positive electrode current collecting tab, and the other one of the electrode terminals is a negative electrode terminal electrically connected to the negative electrode current collecting tab. The electrode terminal may be an internal terminal formed inside the container member, or an external terminal formed on an outer surface of the container member. The electrode terminal is formed of an electro-conductive material, and is preferably formed of at least a kind of metal selected from the group consisting of aluminum, zinc, titanium, and iron, or an alloy thereof.

FIG. 2 shows an example of a single cell 20 forming the battery 2. In the example of FIG. 2, the single cell 20 includes a container member 21 and an electrode group 22. The container member 21 is the above-described laminate film. The electrode group 22 is housed inside the container member 21, and the electrode group 22 is impregnated with an electrolytic solution. The electrode group 22 has a stack structure in which a plurality of positive electrodes 23 and a plurality of negative electrodes 25 are alternately stacked, and a separator 26 is provided between the positive electrode 23 and the negative electrode 25. In each of the positive electrodes 23, a positive electrode active material-containing layer 23B is supported on both surfaces of a positive electrode current collector 23A, and in each of the negative electrodes 25, a negative electrode active material-containing layer 25B is supported on both surfaces of a negative electrode current collector 25A. In addition, in the electrode group 22, a positive electrode current collecting tab 23C as a portion not supporting the positive electrode active material-containing layer 23B in the positive electrode current collector 23A is formed, and the positive electrode current collecting tab 23C protrudes with respect to the negative electrode 25 and the separator 26. In the electrode group 22, a negative electrode current collecting tab 25C as a portion not supporting the negative electrode active material-containing layer 25B in the negative electrode current collector 25A is formed, and the negative electrode current collecting tab 25C protrudes to a side opposite to the side to which the positive electrode current collecting tab 23C protrudes, with respect to the positive electrode 23 and the separator 26.

Further, two openings are formed in the container member 21, and each of the openings is closed by heat-sealing, etc. of the resin layers of the laminate film. A positive electrode terminal 27 is connected to the positive electrode current collecting tab 23C, and the positive electrode terminal 27 is drawn out of the container member 21 from one of the two openings of the container member 21. A negative electrode terminal 28 is connected to the negative electrode current collecting tab 25C, and the negative electrode terminal 28 is drawn out of the container member 21 from the other one of the two openings of the container member 21 which is different from the opening out of which the positive electrode terminal 27 is drawn.

As shown in FIG. 1, an electric power supply and a load (denoted by reference sign 7) are provided in the management system 1. The electric power supply can supply electric power to the battery 2, and the battery 2 is charged by supply of electric power from the electric power supply, etc. Electric power can be supplied to the load from the battery 2, and the battery 2 is discharged by supply of electric power to the load, etc. Examples of the electric power supply include a battery different from the battery 2, an electric power generator, etc. Examples of the load include an electric motor, a light, etc. In an example, a capacitor to which electric power is supplied from the battery 2 may be provided in place of, or in addition to, the load. In this case, the battery 2 is discharged by supply of electric power to the capacitor. Then, the capacitor can store therein electric power supplied from the battery 2. In still another example, a motor generator may be provided. In this case, electric power can be supplied to the motor generator from the battery 2 as well as supplied to the battery 2 from the motor generator. In other words, the motor generator functions as both an electric power supply and a load. In FIG. 1, the electric power supply and the load are mounted in the battery-mounted apparatus 6, but are not limited thereto. The battery 2 may be able to supply electric power to a load outside the battery-mounted apparatus 6, and electric power may be supplied to the battery 2 from an electric power supply outside the battery-mounted apparatus 6.

The management device 3 performs control and management of the battery 2, such as controlling charging and discharging of the battery 2. The management device 3 includes a controller 10. In an example of FIG. 1, the management device 3 is mounted in the battery-mounted apparatus 6, and forms a processing device (computer) in the battery-mounted apparatus 6. The controller 10 of the management device 3 includes a processor and a non-transitory storage medium. The processor includes any one of a central processing unit (CPU), a graphics processing unit (GPU), an application specific integrated circuit (ASIC), a microcomputer, a field programmable gate array (FPGA), a digital signal processor (DSP), etc. In the storage medium, an auxiliary storage device can be included, in addition to a main storage device such as a memory. Examples of the storage medium include a magnetic disc, an optical disk (CD-ROM, CD-R, DVD, etc.), a magneto-optical disk (MO, etc.), a semiconductor memory, etc. The controller 10 may include one or more processors and non-transitory storage media. In the controller 10, the processor performs processing by executing a program, etc. stored in the storage medium, etc. In addition, a program executed by the processor of the controller 10 may be stored in a computer (server) connected through a network, such as the Internet, or a server in a cloud environment, etc. In this case, the processor downloads the program via the network.

In addition, the management device 3 may be provided outside the battery-mounted apparatus 6. In this case, the management device 3 is, for example, a server outside the battery-mounted apparatus 6, and can communicate with a processing device (computer) mounted in the battery-mounted apparatus 6 via the network. Also in this case, the controller 10 of the management device 3 includes a processor and a non-transitory storage medium. In addition, processing of the controller 10 of the management device 3 may be performed by a processing device mounted in the battery-mounted apparatus 6 and a server (processing device) outside the battery-mounted apparatus 6 in cooperation. In this case, for example, the server, etc. outside the battery-mounted apparatus 6 is a master control device, and the processing device, etc. mounted in the battery-mounted apparatus 6 is a slave control device. In another example, processing of the controller 10 of the management device 3 may be performed by a cloud server constructed in a cloud environment. Herein, the infrastructure of the cloud environment is constructed by a virtual processor such as a virtual CPU and a cloud memory. Thus, in a case where the cloud server serves as the controller 10, processing is performed by the virtual processor, and data necessary for the processing, etc. is stored in the cloud memory. In addition, the processing of the controller 10 may be performed by a processing device mounted in the battery-mounted apparatus 6 and the cloud server in cooperation. In this case, the processing device (computer) mounted in the battery-mounted apparatus 6 can communicate with the cloud server.

A driving circuit 11 is provided in the management system 1. The controller 10 controls supply of electric power to the load from the battery 2 as well as supply of electric power to the battery 2 from the electric power supply by controlling driving of the driving circuit 11. Namely, the controller 10 controls charging and discharging of the battery 2 by controlling the driving of the driving circuit 11. The driving circuit 11 includes a relay circuit that performs switching between output of electric power from the battery 2 and input of electric power to the battery 2. Further, the driving circuit 11 includes a conversion circuit, and the conversion circuit converts electric power from the electric power supply into direct-current electric power to be supplied to the battery. The conversion circuit also converts direct-current electric power from the battery into electric power to be supplied to the load. The conversion circuit can include a voltage transformer circuit, a DC/AC conversion circuit, an AC/DC conversion circuit, etc. In the example of FIG. 1, the driving circuit 11 is mounted in the battery pack 5, but may be formed outside the battery pack 5 in the battery-mounted apparatus 6.

In addition, a current detection circuit 12 and a voltage detection circuit 13 are provided in the management system 1. The current detection circuit 12 and voltage detection circuit 13, for example, form measurement circuits mounted in the battery pack 5. By the measurement circuits, parameters associated with the battery 2 are detected and measured. In each of charging, discharging, etc. of the battery 2, the current detection circuit 12 detects a current flowing through the battery 2. In each of charging, discharging, etc. of the battery 2, the voltage detection circuit 13 detects a voltage of the battery 2. In the example of FIG. 1, the measurement circuits such as the current detection circuit 12 and the voltage detection circuit 13 are mounted in the battery pack 5, but may be formed outside the battery pack 5 in the battery-mounted apparatus 6.

The controller 10 of the management device 3 controls charging and discharging of the battery 2 based on a detection result of each of the current detection circuit 12 and the voltage detection circuit 13. In addition, the controller 10 acquires a use condition imposed on the battery 2 in charging, discharging, etc. of the battery 2 such as a voltage range imposed on the battery 2 in charging, discharging, etc. of the battery 2 from the storage medium or the virtual memory of the cloud server. Then, the controller 10 controls charging and discharging of the battery 2 based on the use condition in addition to the detection results of current and voltage of the battery 2. For example, in charging of the battery 2, charging is controlled such that a voltage V of the battery 2 does not exceed an upper limit value Vmax of the voltage range imposed on the battery 2. In addition, in discharging from the battery 2, discharging is controlled such that the voltage V of the battery 2 does not drop below a lower limit value Vmin of the voltage range imposed on the battery 2. In an example, discharging from the battery 2 is terminated based on the voltage V of the battery 2 dropping to the above-described lower limit value Vmin of the voltage range. In this case, the lower limit value Vmin of the voltage range is a discharging termination voltage value Ve. In another example, the discharging termination voltage value Ve may be set to a value higher than the lower limit value Vmin of the voltage range. In this case, discharging from the battery 2 is terminated based on the voltage V of the battery 2 dropping to the discharging termination voltage value Ve higher than the lower limit value Vmin.

In addition, in the management system 1, a user interface 15 is mounted in the battery-mounted apparatus 6. The user interface 15 serves as an operation device on which an operation, etc. is input by a user, etc. of the battery-mounted apparatus 6, as well as a notification device that notifies the user, etc. of the battery-mounted apparatus 6 of information. The user interface 15 includes any one of a button, a dial, a touch panel, etc. as the operation device, and the controller 10 performs processing based on an operation instruction, etc. input in the user interface. In addition, the controller 10 notifies the user, etc. of information, etc. via the user interface 15. The user interface 15 performs notification of information through any one of screen display, sounds, etc.

FIG. 3 shows an example of processing performed by the controller 10 of the management device 3 in charging of the battery 2. The processing of FIG. 3 is performed by the controller 10 every time charging of the battery 2 is performed. Accordingly, the processing of FIG. 3 shows processing performed in a single charging of the battery 2. In the following descriptions, time t is prescribed as a variable of time. Then, a current I(t) supplied to the battery 2 and a voltage V(t) of the battery 2 at time t are prescribed. In addition, in charging of the battery 2, the current I(t) is regularly detected by the current detection circuit 12, and the voltage V(t) is regularly detected by the voltage detection circuit 13. Then, the controller 10 regularly acquires detection results of the current I(t) and the voltage V(t). A time interval for detecting each of the current I(t) and the voltage V(t) is preferably from 0.1 second to 20 seconds.

As shown in FIG. 3, when charging of the battery 2 is started, the controller 10 charges the battery 2 in a constant current mode in which the current I(t) supplied to the battery 2 is held constant at a reference current value Ic over time (S51). The reference current value Ic is stored in the storage medium, etc., and is set within a current range imposed on the battery 2 as a use condition in uses such as charging. Then, the controller 10 determines whether the voltage V(t) of the battery 2 is the reference voltage value Vc or more in a state where charging of the battery 2 in the constant current mode is being performed (S52). Namely, whether the voltage V(t) increases to the reference voltage value Vc is determined. The reference voltage value Vc is stored in the storage medium, etc. In an example, the reference voltage value Vc is set to the same value as the upper limit value Vmax of the voltage range imposed on the battery 2 as the use condition in uses such as charging, and is set to a value lower than the upper limit value Vmax of the voltage range in another example. In either case, the reference voltage value Vc is higher than the lower limit value Vmin of the voltage range and the discharging termination voltage value Ve.

If the voltage V(t) is lower than the reference voltage value Vc (S52—No), the controller 10 performs a determination process in the constant current mode (S53). If it is determined that the battery 2 is usable in the determination process at S53 (S54—Yes), the process returns to S51, and the controller 10 sequentially performs processes at S51 and the subsequent steps. Accordingly, charging of the battery 2 in the constant current mode in which the current I(t) is held constant at the reference current value Ic over time is continued. On the other hand, if it is determined that the battery 2 is unusable in the determination process at S53 (S54—No), the controller 10 performs at least one of a forced stopping of charging of the battery 2 and notification that the battery 2 is unusable (S60). Herein, the controller 10 forcibly stops charging of the battery 2 by controlling driving of the driving circuit 11. In addition, the controller 10 notifies the user, etc. of the battery 2 being unusable via the user interface 15.

If the voltage V(t) is the reference voltage value Vc or more at S52 (S52—Yes), the controller 10 charges the battery 2 in the constant voltage mode in which the voltage V(t) of the battery 2 is held constant at the reference voltage value Vc over time (S55). Accordingly, charging of the battery 2 in the constant current mode is switched to charging of the battery 2 in the constant voltage mode. Then, the controller 10 determines whether the current I(t) supplied to the battery 2 is the termination current value Ie or less in a state where charging of the battery 2 in the constant voltage mode is being performed (S56). Namely, whether the current I(t) drops to the termination current value Ie is determined. The termination current value Ie is stored in the storage medium, etc. In an example, the termination current value Ie is set to the same value as the lower limit value Imin of the current range imposed on the battery 2 as the use condition in uses such as charging, and is set to a value higher than the lower limit value Imin of the current range in another example.

If the current I(t) is higher than the termination current value Ie (S56—No), the controller 10 performs a determination process in the constant voltage mode (S57). If it is determined that the battery 2 is usable in the determination process at S57 (S58—Yes), the process returns to S55, and the controller 10 sequentially performs processes at S55 and the subsequent steps. Accordingly, charging of the battery 2 in the constant voltage mode in which the voltage V(t) is held constant at the reference voltage value Vc over time is continued. On the other hand, if it is determined that the battery 2 is unusable in the determination process at S57 (S58—No), the controller 10 performs at least one of a forced stopping of charging of the battery 2 and notification that the battery 2 is unusable (S60). If the current I(t) is the termination current value Ie or less at S56 (S56—Yes), the controller 10 terminates charging of the battery 2 by controlling driving of the driving circuit 11 (S59).

Since the processes as described above are performed, as long as it is determined that the battery 2 is usable, the controller 10, after charging the battery 2 in the constant current mode from a starting time of charging, switches the constant current mode to the constant voltage mode to charge the battery 2 until a finishing time of charging. At this time, in charging of the battery 2 in the constant current mode, the controller 10 switches the mode to the constant voltage mode based on the voltage V(t) of the battery 2 increasing to the reference voltage value Vc. Then, in charging of the battery 2 in the constant voltage mode, the controller 10 terminates charging based on the current I(t) supplied to the battery 2 dropping to the termination current value Ie.

Figure 4:
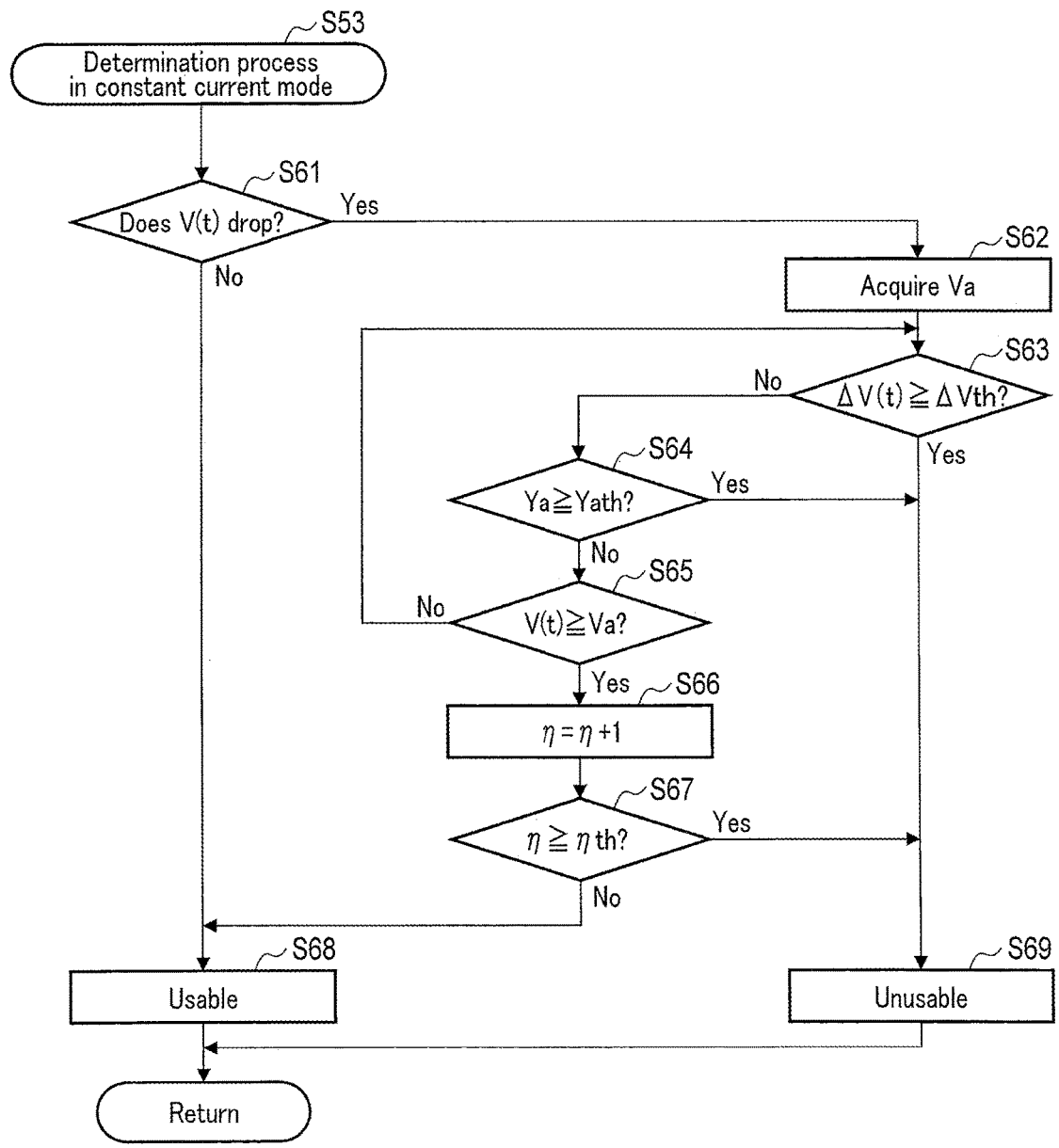
FIG. 4 is a flowchart showing an example of a determination process in a constant current mode in FIG. 3.

FIG. 4 shows an example of the determination process (S53) in the constant current mode in FIG. 3. As shown in FIG. 4, in the determination process in charging of the battery 2 in the constant current mode, the controller 10 determines whether the voltage V(t) drops over time (S61). In an example, the controller 10 determines whether the voltage V(t) drops by comparing a real-time voltage V(t) with a voltage V(t−1) in the previous detection. In another example, the controller 10 determines whether the voltage V(t) drops based on a value V'(t) obtained by time-differentiating a real-time voltage V(t). If the voltage V(t) does not drop (S61—No), the controller 10 determines that the battery 2 is usable (S68).

On the other hand, if the voltage V(t) drops (S61—Yes), the controller 10 identifies a starting time of dropping of the voltage V(t). Then, the controller 10 acquires a voltage value Va at the starting time of dropping of the voltage V(t) (S62). The controller 10 acquires a voltage drop amount ΔV(t) of the voltage V(t) from the voltage value Va at the starting time of dropping. The voltage drop amount ΔV(t) is, for example, calculated by subtracting the real-time voltage V(t) from the voltage value Va at the starting time of dropping. Then, the controller 10 determines whether the voltage drop amount ΔV(t) is a voltage threshold value ΔVth or more (S63). Namely, whether the voltage V(t) drops by the voltage threshold value ΔVth or more from the voltage value Va at the starting time of dropping is determined. The voltage threshold value ΔVth is stored in the storage medium, etc. In an example, the voltage threshold value ΔVth is set based on a difference value (Vmax−Vmin) between the upper limit value Vmax and the lower limit value Vmin of the voltage range imposed on the battery 2 as the use condition in uses such as charging. In this case, the voltage threshold value ΔVth is preferably from 1/50 to 1/5 of the difference value (Vmax−Vmin). As described above, the reference voltage value Vc is set to be lower than the upper limit value Vmax of the voltage range, and the above-described discharging termination voltage value ye is set to be higher than the lower limit value Vmin of the voltage range. In this case, the voltage threshold value ΔVth may be set based on a difference value (Vc−Ve) between the reference voltage value Vc and the discharging termination voltage value Ve, instead of the difference value (Vmax−Vmin) between the upper limit value Vmax and the lower limit value Vmin. If the voltage drop amount ΔV(t) from the starting time of dropping is the voltage threshold value ΔVth or more (S63—Yes), the controller 10 determines that the battery 2 is unusable (S69).

In addition, if the voltage V(t) drops (S61—Yes), the controller 10 acquires an elapsed time Ya from the starting time of dropping of the voltage V(t). If the voltage drop amount $\Delta V(t)$ from the starting time of dropping is smaller than the voltage threshold value $\Delta Vth$ at S63 (S63—No), the controller 10 determines whether the elapsed time Ya from the starting time of dropping is a time threshold value (a first time threshold value) Yath or more (S64). Namely, whether the time threshold value Yath or more has passed from the starting time of dropping of the voltage V(t) is determined. The time threshold value Yath is stored in the storage medium, etc., and is preferably from 1 minute to 5 minutes. If the elapsed time Ya from the starting time of dropping of the voltage V(t) is the time threshold value Yath or more (S64—Yes), the controller 10 determines that the battery 2 is unusable (S69).

On the other hand, if the elapsed time Ya from the starting time of dropping of the voltage V(t) is shorter than the time threshold value Yath (S64—No), the controller 10 determines whether the real-time voltage V(t) is the voltage value Va at the starting time of dropping or more (S65). Namely, whether the voltage V(t) increases again to the voltage value Va at the starting time of dropping is determined. If the voltage V(t) is lower than the voltage value Va at the starting time of dropping (S65—No), the process returns to S63, and the controller 10 sequentially performs processes at S63 and the subsequent steps. Thus, the determination process in the constant current mode is continued.

In addition, in the charging processing of the battery 2, the controller 10 prescribes a count number n. At a starting time of use of the battery 2, the count number $\eta$ is set to 0. Namely, an initial value of the count number $\eta$ is 0. If the voltage V(t) is the voltage value Va at the starting time of dropping or more at S65 (S65—Yes), the controller 10 adds 1 to the above-described count number $\eta$ (S66). Then, the controller 10 determines whether the added count number $\eta$ is a count number threshold value $\eta th$ or more (S67). The count number threshold value $\eta th$ is stored in the storage medium, etc., and is preferably from 4 to 10. If the count number $\eta$ is the count number threshold value $\eta th$ or more (S67—Yes), the controller 10 determines that the battery 2 is unusable (S69). On the other hand, if the count number $\eta$ is smaller than the count number threshold value $\eta th$ (S67—No), the controller 10 determines that the battery 2 is usable (S68).

Figure 5:
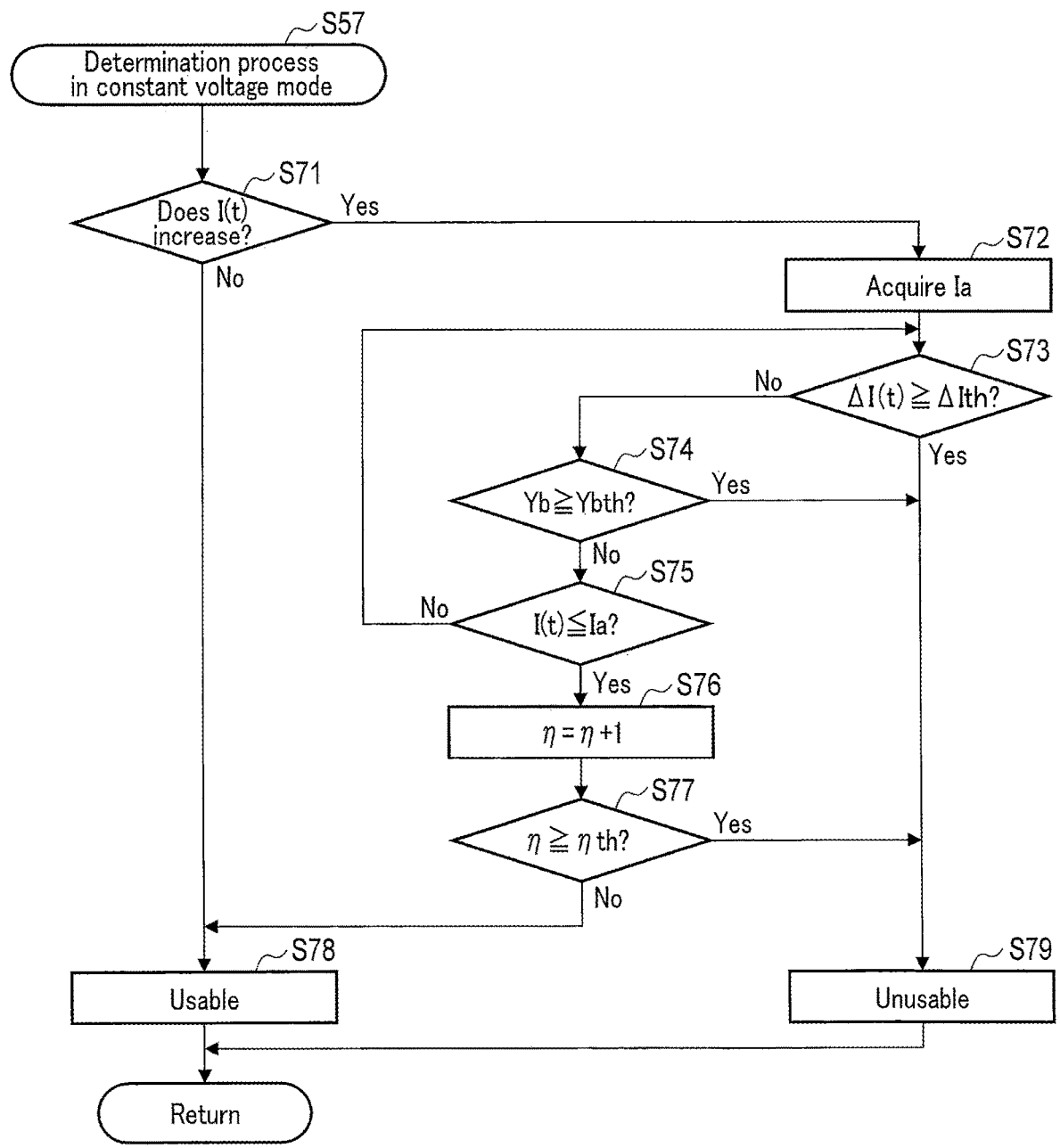
FIG. 5 is a flowchart showing an example of a determination process in a constant voltage mode in FIG. 3.

FIG. 5 shows an example of the determination process (S57) in the constant voltage mode in FIG. 3. As shown in FIG. 5, in the determination process in charging of the battery 2 in the constant voltage mode, the controller 10 determines whether the current I(t) increases over time (S71). In an example, the controller 10 determines whether the current I(t) increases by comparing a real-time current I(t) and a current I(t−1) in the previous detection. In another example, the controller 10 determines whether the current I(t) increases based on a value I'(t) obtained by differentiating a real-time current I(t) by time. If the current I(t) does not increase (S71—No), the controller 10 determines that the battery 2 is usable (S78).

On the other hand, if the current I(t) increases (S71—Yes), the controller 10 identifies a starting time of increasing of the current I(t). Then, the controller 10 acquires a current value Ia at the starting time of increasing of the current I(t) (S72). The controller 10 acquires a current increase amount $\Delta I(t)$ of the current I(t) from the current value Ia at the starting time of increasing. The current increase amount $\Delta I(t)$ is, for example, calculated by subtracting the current value Ia at the starting time of increasing from the real-time current I(t). Then, the controller 10 determines whether the current increase amount $\Delta I(t)$ is a current threshold value filth or more (S73). Namely, whether the current I(t) increases by the current threshold value $\Delta Ith$ or more from the current value Ia at the starting time of increasing is determined. The current threshold value $\Delta Ith$ is stored in the storage medium, etc. In an example, the current threshold value $\Delta Ith$ is set based on a rated current value at which a rated capacity of the battery 2 is discharged in 1 hour. In this case, the current threshold value $\Delta Ith$ is preferably from $\frac{1}{20}$ to $\frac{1}{5}$ of the rated current value. If the current increase amount $\Delta I(t)$ from the starting time of increasing is the current threshold value $\Delta Ith$ or more (S73—Yes), the controller 10 determines that the battery 2 is unusable (S79).

In addition, if the current I(t) increases (S71—Yes), the controller 10 acquires an elapsed time Yb from the starting time of increasing of the current I(t). If the current increase amount $\Delta I(t)$ from the starting time of increasing is smaller than the current threshold value $\Delta Ith$ at S73 (S73—No), the controller 10 determines whether the elapsed time Yb from the starting time of increasing is a time threshold value (a second time threshold value) Ybth or more (S74). Namely, whether the time threshold value Ybth or more has passed from the starting time of increasing of the current I(t) is determined. The time threshold value Ybth is stored in the storage medium, etc. The time threshold value Ybth may be the same value as the above-described time threshold value Yath, or a value different from the time threshold value Yath. The time threshold value Ybth is preferably from 1 minute to 5 minutes. If the elapsed time Yb from the starting time of increasing of the current I(t) is the time threshold value Ybth or more (S74—Yes), the controller 10 determines that the battery 2 is unusable (S79).

On the other hand, if the elapsed time Yb from the starting time of increasing of the current I(t) is shorter than the time threshold value Ybth (S74—No), the controller 10 determines whether the real-time current I(t) is the current value Ia at the starting time of increasing or less (S75). Namely, whether the current I(t) drops again to the current value Ia at the starting time of increasing is determined. If the current I(t) is higher than the current value Ia at the starting time of increasing (S75—No), the process returns to S73, and the controller 10 sequentially performs processes at S73 and the subsequent steps. Thus, the determination process in the constant voltage mode is continued.

On the other hand, if the current I(t) is the current value Ia at the starting time of increasing or less (S75—Yes), the controller 10 adds 1 to the above-described count number $\eta$ (S76). Then, the controller 10 determines whether the added count number $\eta$ is the above-described count number threshold value $\eta th$ or more (S77). If the count number $\eta$ is the count number threshold value $\eta th$ or more (S77—Yes), the controller 10 determines that the battery 2 is unusable (S79). On the other hand, if the count number $\eta$ is smaller than the count number threshold value $\eta th$ (S77—No), the controller 10 determines that the battery 2 is usable (S78).

Processing as described above is performed, whereby in charging of the battery 2 in the constant current mode, the controller 10 determines that the battery 2 is unusable based on the voltage V(t) of the battery 2 dropping by the voltage threshold value $\Delta Vth$ or more from the starting time of dropping without increasing again to the voltage value Va at the starting time of dropping. In addition, in charging of the battery 2 in the constant voltage mode, the controller 10 determines that the battery 2 is unusable based on the current I(t) supplied to the battery 2 increasing by the current threshold value $\Delta Ith$ or more from the starting time of increasing without dropping again to the current value Ia at the starting time of increasing.

Processing as described above is performed, whereby in charging of the battery 2 in the constant current mode, the controller 10 determines that the battery 2 is unusable based on the time threshold value (first time threshold value) Yath or more having passed from the starting time of dropping of the voltage. V(t) of the battery 2 without the voltage V(t) increasing again to the voltage value Va at the starting time of dropping. In addition, in charging of the battery 2 in the constant voltage mode, the controller 10 determines that the battery 2 is unusable based on the time threshold value (second time threshold value) Ybth or more having passed from the starting time of increasing of the current I(t) supplied to the battery 2 without the current I(t) dropping again to the current value Ia at the starting time of increasing.

Further, in charging of the battery 2 in the constant current mode, the number of times (first number of times) η1 where the voltage V(t) increases again to the voltage value Va at the starting time of dropping without dropping by the voltage threshold value ΔVth or more from the starting time of dropping and before the time threshold value Yath passes from the starting time of dropping is prescribed. Then, in charging of the battery 2 in the constant voltage mode, the number of times (second number of times) η2 where the current I(t) drops again to the current value Ia at the starting time of increasing without increasing by the current threshold value ΔIth or more from the starting time of increasing and before the time threshold value Ybth passes from the starting time of increasing is prescribed. In this case, the above-described count number η is a sum of the number of times η1 and η2. In the present embodiment, processing as described above is performed, whereby the controller 10 determines that the battery 2 is unusable based on the count number becoming the count number threshold value ηth or more.

Figure 6:
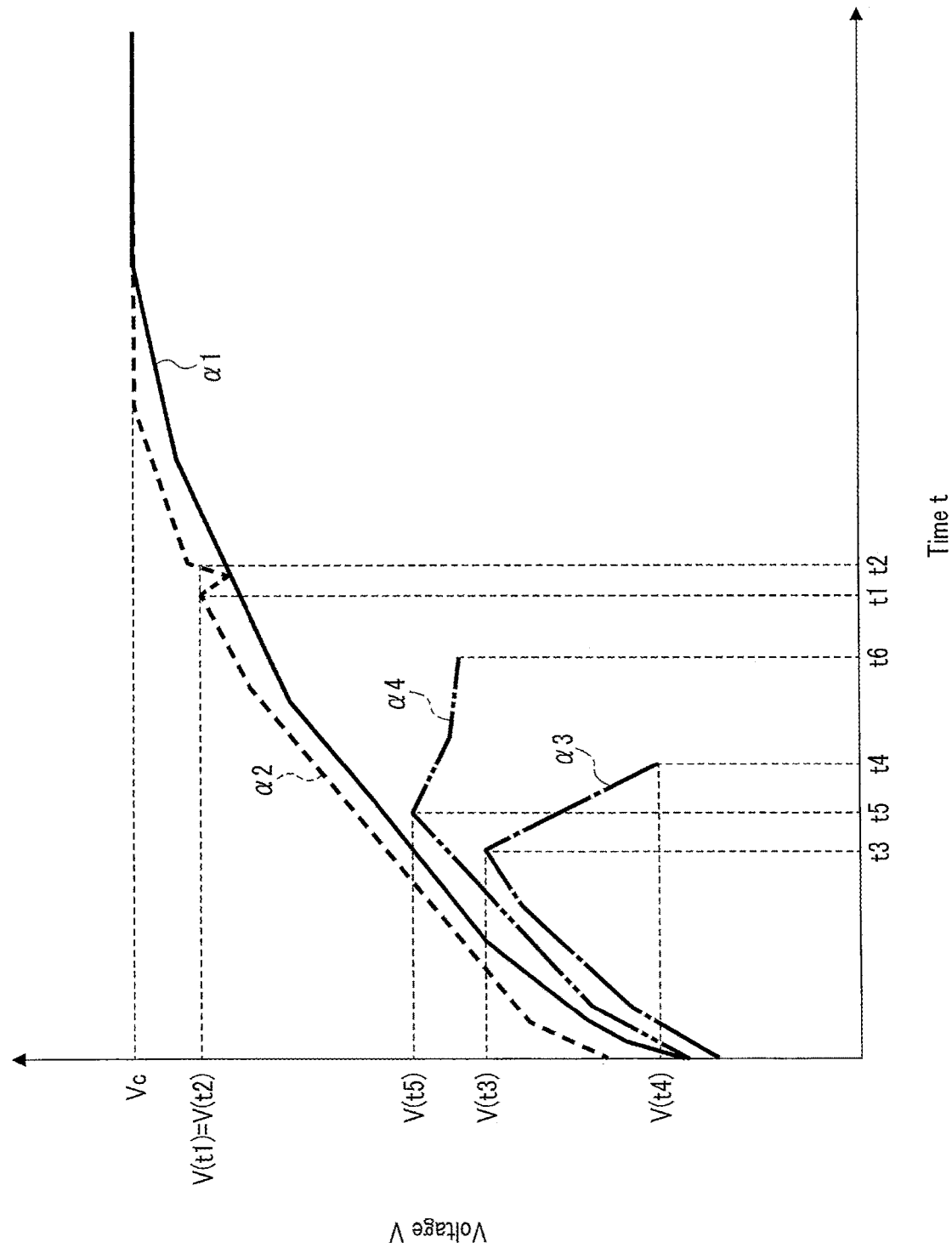
FIG. 6 is a schematic view showing an example of a temporal change in voltage of the battery in charging in the constant current mode of the battery according to the embodiment.

FIG. 6 is a diagram showing an example of a temporal change in voltage V of the battery 2 in charging of the battery 2 in the constant current mode. In FIG. 6, an abscissa axis represents the time t, and an ordinate axis represents the voltage V. In addition, in FIG. 6, four patterns α1 to α4 are shown as temporal changes in voltage V. In pattern α1 in FIG. 6, the voltage V(t) continuously increases until it reaches the reference voltage value Vc from a start of charging the battery 2 in the constant current mode. Thus, in pattern α1, at any point in time until the voltage V(t) reaches the reference voltage value Vc from the start of charging the battery 2, the controller 10 determines in the process at S61 that the voltage V(t) does not drop. Accordingly, at any point in time until the voltage V(t) reaches the reference voltage value Vc from the start of charging the battery 2, the controller 10 determines that the battery 2 is usable by the process at S68.

In addition, in pattern α2, at time t1, the voltage V(t) starts dropping. However, in pattern α2, the voltage V(t) does not drop significantly from a voltage value V(t1) at a starting time of dropping, and a voltage drop amount ΔV(t) from the starting time of dropping (time t1) does not become the voltage threshold value ΔVth or more. In addition, in pattern α2, the voltage V(t) increases again to the voltage value V(t1) at the starting time of dropping at time t2 before the time threshold value Yath passes from the starting time of dropping (time t1), and a voltage value V(t2) at time t2 becomes the same magnitude as that of the voltage value V(t1) at the starting time of dropping. In pattern α2, until time t1, the controller 10 determines in the process at S61 that the voltage V(t) does not drop, and determines by the process at S68 that the battery 2 is usable. Then, immediately after time t1, the controller 10 determines in the process at S61 that the voltage V(t) drops, and acquires the voltage value V(t1) at time t1 as the voltage value Va at the starting time of dropping by the process at S62. Between time t1 and time t2, the controller 10 determines in the process at S63 that the voltage drop amount ΔV(t) is smaller than the voltage threshold value ΔVth, and determines in the process at S64 that an elapsed time Ya from the starting time of dropping (time t1) is shorter than the time threshold value Yath. In addition, between time t1 and time t2, the controller 10 determines in the process at S65 that the voltage V(t) is lower than the voltage value Va (voltage value V(t1)) at the starting time of dropping.

Then, at time t2 or immediately after time t2, the controller 10 determines in the process at S65 that the voltage V(t) is the voltage value Va (voltage value V(t1)) at the starting time of dropping or more, and adds 1 to the count number by the process at S66. In addition, in pattern α2, the controller 10 determines at S67 that the count number η to which 1 is added is smaller than the count number threshold value ηth, and continues charging of the battery 2 in the constant current mode after time t2. Then, from time t2 until the voltage V(t) reaches the reference voltage value Vc, the controller 10 determines in the process at S61 that the voltage V(t) does not drop, and determines by the process at S68 that the battery 2 is usable.

In addition, in pattern α3, at time t3, the voltage V(t) starts dropping. Then, in pattern α3, a voltage V(t) drops significantly from a voltage value V(t3) at a starting time of dropping, and a voltage drop amount ΔV(t) from the starting time of dropping (time t3) becomes the voltage threshold value ΔVth or more at time t4. In pattern α3, until time t3, the controller 10 determines in the process at S61 that the voltage V(t) does not drop, and determines by the process at S68 that the battery 2 is usable. Then, immediately after time t3, the controller 10 determines in the process at S61 that the voltage V(t) drops, and acquires the voltage value V(t3) at time t3 as a voltage value Va at the starting time of dropping by the process at S62. Between time t3 and time t4, the controller 10 determines in the process at S63 that the voltage drop amount ΔV(t) is smaller than the voltage threshold value ΔVth, and determines in the process at S64 that an elapsed time Ya from the starting time of dropping (time t3) is shorter than the time threshold value Yath. In addition, between time t3 and time t4, the controller 10 determines in the process at S65 that the voltage V(t) is lower than the voltage value Va (voltage value V(t3)) at the starting time of dropping. Then, at time t4 or immediately after time t4, the controller 10 determines in the process at S63 that the voltage drop amount ΔV(t) is the voltage threshold value ΔVth or more, and determines in the process at S69 that the battery 2 is unusable. Thereby, at time t4 or immediately after time t4, the controller 10 forcibly stops charging of the battery 2.

In addition, in pattern α4, at time t5, a voltage V(t) starts dropping. Then, in pattern α4, the voltage V(t) does not increase again to a voltage V(t5) at a starting time of dropping (time t5) even at time t6 at which the time threshold value Yath has passed from the starting time of dropping. In pattern α4, until time t5, the controller 10 determines in the process at S61 that the voltage V(t) does not drop, and determines in the process at S68 that the battery 2 is usable. Then, immediately after time t5, the controller 10 determines in the process at S61 that the voltage V(t) drops, and acquires a voltage value V(t5) at time t5 as a voltage value Va at the starting time of dropping by the process at S62. Between time t5 and time t6, the controller 10 determines in the process at S63 that a voltage drop amount $\Delta V(t)$ is smaller than the voltage threshold value $\Delta Vth$, and determines in the process at S64 that an elapsed time Ya from the starting time of dropping (time t5) is shorter than the time threshold value Yath. In addition, between time t5 and time t6, the controller 10 determines in the process at S65 that the voltage V(t) is lower than a voltage value Va (voltage value V(t5)) at the starting time of dropping. Then, at time t6 or immediately after time t6, the controller 10 determines in the process at S64 that the elapsed time Ya from the starting time of dropping (time t5) is the time threshold value Yath or more, and determines in the process at S69 that the battery 2 is unusable. Thereby, at time t6 or immediately after time t6, the controller 10 forcibly stops charging of the battery 2.

Figure 7:
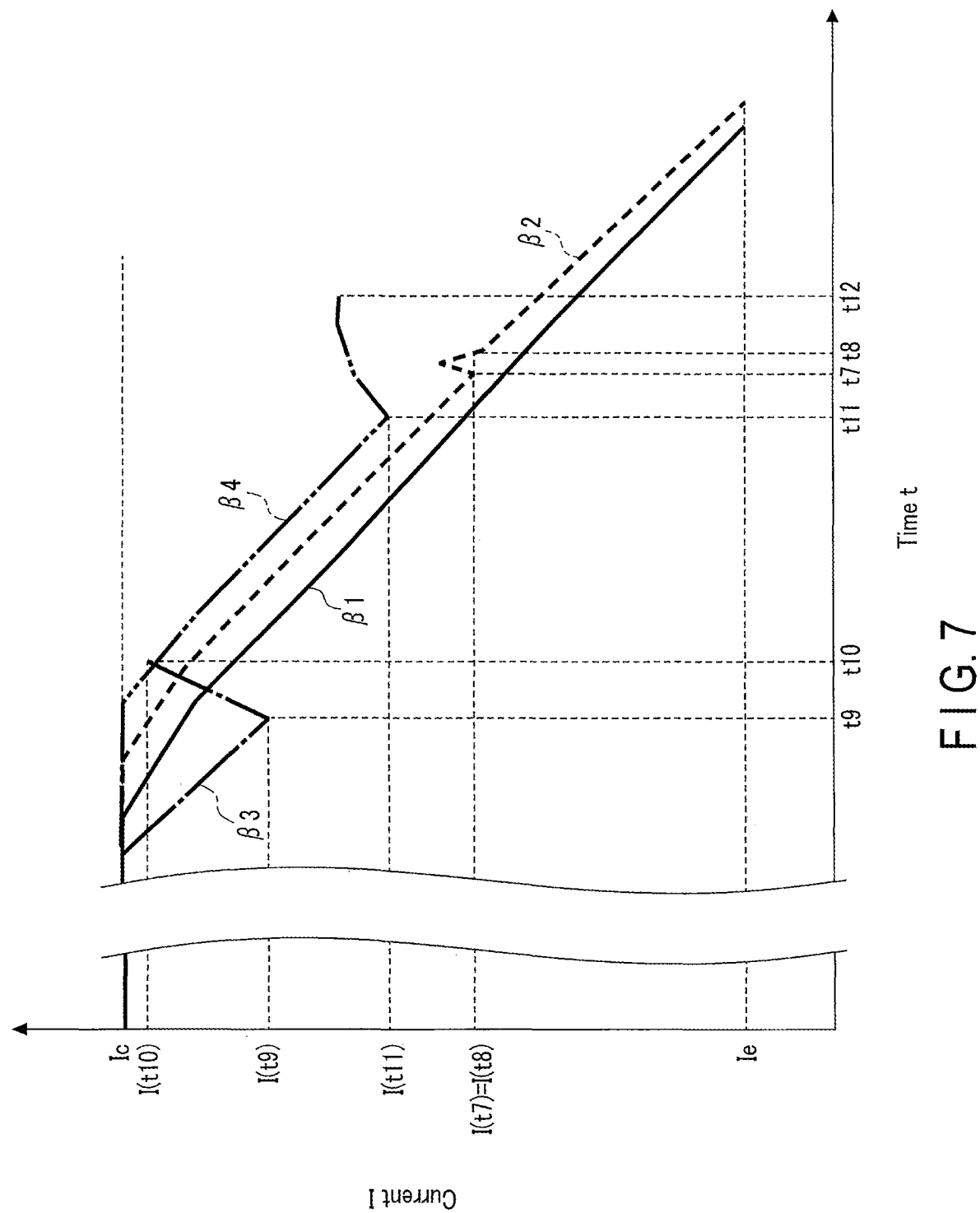
FIG. 7 is a schematic view showing an example of a temporal change in current supplied to the battery in charging in the constant voltage mode of the battery according to the embodiment.

FIG. 7 is a diagram showing an example of a temporal change in current I of the battery 2 in charging of the battery 2 in a constant voltage mode. In FIG. 7, an abscissa axis represents time t, and an ordinate axis represents the current I. In addition, in FIG. 7, four patterns $\beta 1$ to $\beta 4$ are shown as temporal changes in current I. In pattern $\beta 1$ in FIG. 7, a current I(t) continuously drops until it reaches a termination current value Ie from a time of switching from the constant current mode to the constant voltage mode. Thus, in pattern $\beta 1$, at any point in time until the current I(t) reaches the termination current value Ie from the time of switching to the constant voltage mode, the controller 10 determines in the process at S71 that the current I(t) does not increase. Accordingly, at any point in time until the current I(t) reaches the termination current value Ie from the time of switching to the constant voltage mode, the controller 10 determines by the process at S78 that the battery 2 is usable.

In pattern $\beta 2$, at time t7, a current I(t) starts increasing. However, in pattern $\beta 2$, the current I(t) does not increase significantly from a current value I(t7) at a starting time of increasing, and a current increase amount $\Delta I(t)$ from the starting time of increasing (time t7) does not become the current threshold value $\Delta Ith$ or more. In addition, in pattern $\beta 2$, the current I(t) drops again to the current value I(t7) at the starting time of increasing at time t8 before the time threshold value Ybth passes from the starting time of increasing (time t7), and a current value I(t8) at time t8 becomes the same magnitude as that of the current value I(t7) at the starting time of increasing. In pattern $\beta 2$, until time t7, the controller 10 determines in the process at S71 that the current I(t) does not increase, and determines by the process at S78 that the battery 2 is usable. Then, immediately after time t7, the controller 10 determines in the process at S71 that the current I(t) increases, and acquires the current value I(t7) at time t7 as a current value Ia at the starting time of increasing by the process at S72. Between time t7 and time t8, the controller 10 determines in the process at S73 that a current increase amount $\Delta I(t)$ is smaller than the current threshold value $\Delta Ith$, and determines in the process at S74 that an elapsed time Yb from the starting time of increasing (time t7) is shorter than the time threshold value Ybth. In addition, between time t7 and time t8, the controller 10 determines in the process at S75 that the current I(t) is larger than the current value Ia (current value I(t7)) at the starting time of increasing.

Then, at time t8 or immediately after time t8, the controller 10 determines in the process at S75 that the current I(t) is the current value Ia at the starting time of increasing (current value I(t7)) or less, and adds 1 to a count number r by the process at S76. In addition, in pattern $\beta 2$, the controller 10 determines at S77 that the count number $\eta$ to which 1 is added is smaller than the count number threshold value $\eta th$, and continues charging of the battery 2 in the constant voltage mode after time t8. Then, until the current I(t) reaches the termination current value Ie from time t8, the controller 10 determines in the process at S71 that the current I(t) does not increase, and determines by the process at S78 that the battery 2 is usable.

In pattern $\beta 3$, at time t9, a current I(t) starts increasing. Then, in pattern $\beta 3$, a current I(t) increases significantly from a current value I(t9) at a starting time of increasing, and a current increase amount $\Delta I(t)$ from the starting time of increasing (time t9) becomes the current threshold value $\Delta Ith$ or more at time t10. In pattern $\beta 3$, until time t9, the controller 10 determines in the process at S71 that the current I(t) does not increase, and determines by the process at S78 that the battery 2 is usable. Then, immediately after time t9, the controller 10 determines in the process at S71 that the current I(t) increases, and acquires the current value I(t9) at time t9 as a current value Ia at the starting time of increasing by the process at S72. Between time t9 and time t10, the controller 10 determines in the process at S73 that the current increase amount $\Delta I(t)$ is smaller than the current threshold value $\Delta Ith$, and determines in the process at S74 that an elapsed time Yb from the starting time of increasing (time t9) is shorter than the time threshold value Ybth. In addition, between time t9 and time t10, the controller 10 determines in the process at S75 that the current I(t) is larger than a current value Ia (current value I(t9)) at the starting time of increasing. Then, at time t10 or immediately after time t10, the controller 10 determines in the process at S73 that the current increase amount $\Delta I(t)$ is the current threshold value $\Delta Ith$ or more, and determines by the process at S79 that the battery 2 is unusable. Thereby, at time t10 or immediately after time t10, the controller 10 forcibly stops charging of the battery 2.

In pattern $\beta 4$, at time t11, a current I(t) starts increasing. Then, in pattern $\beta 4$, the current I(t) does not drop again to a current value I(t11) at a starting time of increasing even at time t12 at which the time threshold value Ybth has passed from the starting time of increasing (time t11). In pattern $\beta 4$, until time t11, the controller 10 determines in the process at S71 that the current I(t) does not increase, and determines by the process at S78 that the battery 2 is usable. Then, immediately after time t11, the controller 10 determines in the process at S71 that the current I(t) increases, and acquires the current value I(t11) at time t11 as a current value Ia at the starting time of increasing by the process at S72. Between time t11 and time t12, the controller 10 determines in the process at S73 that a current increase amount $\Delta I(t)$ is smaller than the current threshold value $\Delta Ith$, and determines in the process at S74 that an elapsed time Yb from the starting time of increasing (time t11) is shorter than the time threshold value Ybth. In addition, between time t11 and time t12, the controller 10 determines in the process at S75 that the current I(t) is larger than the current value Ia (current value I(t11)) at the starting time of increasing. Then, at time t12 or immediately after time t12, the controller 10 determines in the process at S74 that the elapsed time Yb from the starting time of increasing (time t11) is the time threshold value Ybth or more, and determines in the process at S79 that the battery 2 is unusable. Thereby, at time t12 or immediately after time t12, the controller 10 forcibly stops charging of the battery 2.

Herein, in charging of the battery 2 in a normal constant current mode, in the same manner as in pattern $\alpha 1$ in FIG. 6, a voltage V(t) continuously increases over time until it reaches a reference voltage value Vc from a start of charging the battery 2 in the constant current mode. Then, in charging of the battery 2 in a normal constant voltage mode, in the same manner as in pattern β1 in FIG. 7, a current I(t) continuously drops over time until it reaches a termination current value Ie from a time of switching to the constant voltage mode.

In addition, in the battery 2, an abnormality making the battery 2 unusable such as occurrence of a short circuit inside and outside the electrode group 22 may occur. On the other hand, in the battery 2, a change that restores the charging capacity of the battery 2 may occur, such as the electrode group 22 being impregnated again with an electrolytic solution, an ion conductivity of lithium ions, etc. being restored between the positive electrode 23 and the negative electrode 25 in the electrode group 22, etc. Even if such a change that restores the charging capacity of the battery 2 occurs, the battery 2 is continuously usable. In charging of the battery 2 in a constant current mode, in any one of a case of occurrence of a short circuit in the battery 2 and a case of occurrence of a change that restores the charging capacity in the battery 2, the voltage V(t) tends to drop. In addition, in charging of the battery 2 in a constant voltage mode, in any one of a case of occurrence of a short circuit in the battery 2 and a case of occurrence of a change that restores the charging capacity in the battery 2, the current I(t) tends to increase.

However, in the case where a change that restores the charging capacity occurs in the battery 2 in charging in the constant current mode, the voltage V(t) from a starting time of dropping tends not to drop significantly in the same manner as in pattern α2 in FIG. 6. In contrast, in a case where a short circuit occurs in the battery 2 in charging in the constant current mode, the voltage V(t) tends to drop significantly from the starting time of dropping in the same manner as in pattern α3 in FIG. 6. In the present embodiment, in charging of the battery 2 in the constant current mode, the controller 10 determines that the battery 2 is unusable based on the voltage V(t) dropping by the voltage threshold value ΔVth or more from the starting time of dropping without increasing again to the voltage value Va at the starting time of dropping. Thus, in charging of the battery 2 in the constant current mode, whether the drop in voltage V(t) is attributed to an abnormality making the battery 2 unusable such as a short circuit, or a change that restores the charging capacity of the battery 2, etc. is properly determined. Namely, in charging of the battery 2 in the constant current mode, whether an abnormality making the battery 2 unusable occurs is properly determined by the controller 10.

In addition, in the case where a change that restores the charging capacity occurs in the battery 2 in charging in the constant voltage mode, the current I(t) from the starting time of increasing tends not to increase significantly in the same manner as in pattern β2 in FIG. 7. In contrast, in the case where a short circuit occurs in the battery 2 in charging in the constant voltage mode, the current I(t) tends to increase significantly from the starting time of increasing in the same manner as in pattern α3 in FIG. 7. In the present embodiment, in charging of the battery 2 in the constant voltage mode, the controller 10 determines that the battery 2 is unusable based on the current I(t) increasing by the current threshold value ΔIth or more from the starting time of increasing without dropping again to the current value Ia at the starting time of increasing. Thus, in charging of the battery 2 in the constant voltage mode, whether the increase in current I(t) is attributed to an abnormality making the battery 2 unusable such as a short circuit, or a change that restores the charging capacity of the battery 2, etc. is properly determined. Namely, in charging of the battery 2 in the constant voltage mode, whether an abnormality making the battery 2 unusable occurs is properly determined by the controller 10.

In addition, in the case where a short circuit occurs in the battery 2 in charging in the constant current mode, although the voltage V(t) does not drop significantly from the starting time of dropping, the voltage V(t) may not increase again to the voltage value Va at the starting time of dropping even if a long time has passed from the starting time of dropping in the same manner as in pattern α4 in FIG. 6. Herein, in the case where a change that restores the charging capacity occurs in charging in the constant current mode, the voltage V(t) tends to increase again to the voltage value Va at the starting time of dropping in a short time from the starting time of dropping in the same manner as in pattern α2 in FIG. 6. Then, in the present embodiment, in charging of the battery 2 in the constant current mode, the controller 10 determines that the battery 2 is unusable based on the time threshold value (first time threshold value) Yath or more having passed from the starting time of dropping without the voltage V(t) increasing again to the voltage value Va at the starting time of dropping. Thus, even in a case where the voltage V(t) changes as in pattern α4 in charging of the battery 2 in the constant current mode, whether the drop in voltage V(t) is attributed to an abnormality making the battery 2 unusable such as a short circuit or a change that restores the charging capacity of the battery 2, etc. is properly determined. Namely, in charging of the battery 2 in the constant current mode, whether an abnormality making the battery 2 unusable occurs is further properly determined by the controller 10.

In addition, in the case where a short circuit occurs in the battery 2 in charging in the constant voltage mode, although the current I(t) does not increase significantly from the starting time of increasing, the current I(t) may not drop again to the current value Ia at the starting time of increasing even if a long time has passed from the starting time of increasing in the same manner as in pattern β4 in FIG. 7. Herein, in the case where a change that restores the charging capacity occurs in charging in the constant voltage mode, the current I(t) tends to drop again to the current value Ia at the starting time of increasing in a short time from the starting time of increasing in the same manner as in pattern β2 in FIG. 7. Then, in the present embodiment, in charging of the battery 2 in the constant voltage mode, the controller 10 determines that the battery 2 is unusable based on the time threshold value (second time threshold value) Ybth or more having passed from the starting time of increasing without the current I(t) dropping again to the current value Ia at the starting time of increasing. Thus, even in a case where the current I(t) changes as in pattern β4 in charging of the battery 2 in the constant voltage mode, whether the drop in current I(t) is attributed to an abnormality making the battery 2 unusable such as a short circuit or a change that restores the charging capacity of the battery 2, etc. is properly determined. Namely, in charging of the battery 2 in the constant voltage mode, whether an abnormality making the battery 2 unusable occurs is further properly determined by the controller 10.

In a case where a short circuit occurs in the battery 2 due to precipitation of lithium metal in the negative electrode in charging in the constant current mode, the voltage V(t) may not drop significantly from the starting time of dropping, and the voltage V(t) may increase again to the voltage value Va at the starting time of dropping in a short time from the starting time of dropping, in the same manner as in pattern α2. Then, in a case where a short circuit occurs in the battery 2 due to precipitation of lithium metal in the negative electrode in charging in the constant voltage mode, the current I(t) may not increase significantly from the starting time of increasing, and the current I(t) may drop again to the current value Ia at the starting time of increasing in a short time from the starting time of increasing, in the same manner as in pattern β2. However, in the present embodiment, an active material containing titanium such as a titanium-containing oxide is used as a negative electrode active material so that an operating electric potential of the negative electrode active material is high, and an operating electric potential of the negative electrode is high. Thus, in the battery 2 of the present embodiment, precipitation of lithium metal in the negative electrode does not occur, and a short circuit in the battery 2 due to the precipitation of lithium metal in the negative electrode does not occur. Therefore, the determination as described above is performed, whereby whether an abnormality making the battery 2 unusable occurs is properly determined based on temporal changes in current and voltage of the battery 2 in charging of the battery 2.

In addition, in a case where a sum of the number of times the voltage V(t) drops by a small drop amount for only a short time as in pattern α2 in charging in the constant current mode and the number of times the current I(t) increases by a small increase amount for only a short time as in pattern β2 in charging in the constant voltage mode is increased, there is a possibility that a short circuit might have occurred in the battery 2 or an internal pressure of a single cell might have increased excessively due to expansion of the electrode group 22. In this case, the battery 2 becomes unusable. In the present embodiment, in addition to performing determination as described above, the controller 10 determines that the battery 2 is unusable based on the count number q having become the count number threshold value ηth or more. Thus, also in a case where a sum of the number of times the voltage V(t) drops by a small drop amount for only a short time as in pattern α2 in charging in the constant current mode and the number of times the current I(t) increases by a small increase amount for only a short time as in pattern β2 in charging in the constant voltage mode is increased, it is properly determined that the battery 2 is unusable.

In addition, in the present embodiment, since the determination is performed as described above, whether each of the drop in voltage V(t) in charging in the constant current mode and the increase in current I(t) in charging in the constant voltage mode is attributed to an abnormality making the battery 2 unusable such as a short circuit or a change that restores the charging capacity of the battery 2, etc. is properly determined. Thus, the battery 2 is usable for a long period of time as compared to a case in which use of the battery 2 is stopped at a point in time at which any one of the drop in voltage V(t) in charging in the constant current mode and the increase in current I(t) in charging in the constant voltage mode first occurs, etc. Namely, the life of the battery 2 from the start to the end of use can be extended.

In addition, in the present embodiment, the controller 10, in a case of determining that the battery 2 is unusable, performs at least one of a forced stopping of charging of the battery 2 and notification that the battery 2 is unusable. Thus, in a case of determining that the battery 2 is unusable, use of the battery 2 is forcibly stopped as appropriate and/or a user of the battery-mounted apparatus 6, etc. is appropriately notified of the battery being unusable, by the controller 10.

In a modification, charging of the battery 2 in a constant power mode may be performed in place of charging in the constant current mode, and in another modification, charging of the battery 2 in the constant power mode may be performed in addition to charging in the constant current mode and the constant voltage mode. In charging of the battery 2 in the constant power mode, the controller 10 holds electric power P(t) to be input to the battery 2 constant over time at a reference power value Pc. In an example, based on the voltage V(t) increasing to the above-described reference voltage value Vc in charging of the battery 2 in the constant power mode, the controller 10 switches from charging in the constant power mode to charging in the constant voltage mode in which the voltage V(t) is held constant over time at the reference voltage value Vc.

In addition, in a case of determining whether the battery 2 is usable in the constant power mode, a determination process similar to the determination process (S53), etc. in the constant current mode shown in FIG. 4 is performed. Thus, in charging of the battery 2 in the constant power mode, the controller 10 determines that the battery 2 is unusable based on the voltage V(t) of the battery 2 dropping by the voltage threshold value ΔVth or more from a starting time of dropping without increasing again to a voltage value Va at the starting time of dropping. Then, in charging of the battery 2 in the constant power mode, the controller 10 determines that the battery 2 is unusable based on the time threshold value (first time threshold value) Yath or more having passed from the starting time of dropping of the voltage V(t) of the battery 2 without the voltage V(t) increasing again to the voltage value Va at the starting time of dropping.

In addition, in the case where charging of the battery 2 in the constant power mode is performed, the count number η is defined in the following manner. Namely, the number of times (first number of times) η1 the voltage V(t) increases again to the voltage value Va at the starting time of dropping before the time threshold value Yath passes from the starting time of dropping without the voltage V(t) dropping by the voltage threshold value ΔVth or more from the starting time of dropping, in charging of the battery 2 in each of the constant current mode and the constant power mode, is prescribed. Then, the number of times (second number of times) η2 the current I(t) drops again to the current value Ia at the starting time of increasing before the time threshold value Ybth passes from the starting time of increasing without the current I(t) increasing by the current threshold value ΔIth or more from the starting time of increasing, in charging of the battery 2 in the constant voltage mode, is prescribed. The count number η is a sum of the number of times η1 and η2. Also in the case where charging of the battery 2 in the constant power mode is performed, the controller 10 determines that the battery 2 is unusable based on the count number η having become the count number threshold value ηth or more.

Since the determination process is performed as described above also in the case where charging of the battery 2 in the constant power mode is performed, the same functions and advantageous effects as those of the above-described embodiment, etc. are exhibited. Namely, whether an abnormality making the battery 2 unusable has occurred is properly determined based on temporal changes in current and voltage of the battery 2 in charging of the battery 2.

Verifications Regarding Embodiment

Furthermore, verifications regarding the above-described embodiment were conducted. Below, the verifications having been conducted will be described.

In the verifications, a single cell in which an electrode group having a stack structure is housed in an inner portion of a laminate film was formed in the same manner as the single cell 20 in the example of FIG. 2. Then, the verifications were conducted using a battery formed of a single cell.

In the single cell, a positive electrode and a negative electrode were formed in the following manner. In the positive electrode, an aluminum foil with a thickness of 15 μm was used as a positive electrode current collector. In addition, as a positive electrode active material, a powder of lithium nickel cobalt manganese composite oxide ($LiNi_{0.5}Co_{0.2}Mn_{0.3}O_2$) as a kind of nickel cobalt manganese composite oxide, which has a D50 value of a particle size of 5 μm, was used. Furthermore, as an electro-conductive agent, acetylene black and artificial graphite as carbonaceous materials were used. As for the artificial graphite, one having a D50 value of a particle size of 3 μm was used. As a binder, polyvinylidene fluoride (PVdF) as a kind of polymer resin was used. These materials were suspended in a solvent of N-methylpyrrolidone (NMP) as a kind of an organic solvent in proportions of 90% by mass of lithium nickel cobalt manganese composite oxide, 2% by mass of acetylene black, 3% by mass of artificial graphite, and 5% by mass of polyvinylidene fluoride so that a slurry was prepared. Then, the prepared slurry was applied to both sides of the aluminum foil and the slurry applied to the aluminum foil was dried and press rolled so that a positive electrode active material-containing layer was formed on both sides of the aluminum foil. Thereby, a positive electrode sheet having a width of 72 mm and a length of 92 mm was formed. In the verifications, 10 sheets of the above-described positive electrode sheet were formed. In each of the positive electrode sheets, a portion not supporting the positive electrode active material-containing layer in the positive electrode current collector, i.e., a positive electrode current collecting tab, was formed over a range of 5 mm from an edge on one side in the length direction.

In the negative electrode, an aluminum foil with a thickness of 25 μm was used as a negative electrode current collector. In addition, as a negative electrode active material, a powder of a niobium-titanium composite oxide ($Nb_2TiO_7$) having a monoclinic structure as a kind of niobium titanium-containing composite oxide was used. Artificial graphite as a carbonaceous material was used as a conductive agent, and polyvinylidene fluoride as a kind of polymer resin was used as a binder. As for the artificial graphite, one having a D50 value of a particle size 3 μm was used. These materials were suspended in a solvent of N-methylpyrrolidone as a kind of an organic solvent in proportions of 90% by mass of niobium-titanium composite oxide having a monoclinic structure, 5% by mass of artificial graphite, and 5% by mass of polyvinylidene fluoride so that a slurry was prepared. Then, the prepared slurry was applied to both sides of the aluminum foil and the slurry applied to the aluminum foil was dried and press rolled so that a negative electrode active material-containing layer was formed on both sides of the aluminum foil. Thereby, a negative electrode sheet having a width of 73 mm and a length of 93 mm was formed. In the verifications, 10 sheets of the above-described negative electrode sheet were formed. In each of the negative electrode sheets, a portion not supporting the negative electrode active material-containing layer in the negative electrode current collector, i.e., a negative electrode current collecting tab, was formed over a range of 5 mm from an edge on one side in the length direction.

The electrode group was formed in a stack structure by alternately stacking the 10 positive electrode sheets and the 10 negative electrode sheets. In addition, in the electrode group, a separator is interposed between the positive electrode sheet and the negative electrode sheet. As the separator, a polyethylene porous film as a kind of a synthetic resin film was used. In addition, in the separator, an alumina particle layer was formed on one surface of the porous film, as a nonconductive particle layer.

Furthermore, in the single cell, the positive electrode current collecting tab is bound, and the bound positive electrode current collecting tab was welded to the aluminum sheet. Then, the aluminum sheet to which the positive electrode current collecting tab was welded was used as a positive electrode terminal of the single cell (battery). As the aluminum sheet to be the positive electrode terminal, a sheet with a thickness of 0.2 mm, a width of 30 mm, and a length of 50 mm was used. In addition, in the single cell, the negative electrode current collecting tab was bound, and the bound negative electrode current collecting tab was welded to the aluminum sheet. Then, the aluminum sheet to which the negative electrode current collecting tab was welded was used as a negative electrode terminal of the single cell (battery). As the aluminum sheet to be the negative electrode terminal, a sheet with a thickness of 0.2 mm, a width of 30 mm, and a length of 50 mm was used.

Then, the formed electrode group was housed in the inner portion of the container member formed of the laminate film. A metal layer of the laminate film was formed of aluminum. In addition, the electrode group was impregnated with an electrolytic solution. As the electrolytic solution, a nonaqueous electrolytic solution was used. In the nonaqueous electrolytic solution, lithium hexafluorophosphate ($LiPF_6$) as a kind of lithium salt was used as an electrolyte to be dissolved in an organic solvent. In addition, as the organic solvent, an organic solvent prepared by mixing propylene carbonate (PC) and diethyl carbonate (DEC) at a volume ratio PC:DEC of 1:2 was used. In the nonaqueous electrolytic solution, $LiPF_6$ was dissolved in the organic solvent to a concentration of M, and 10 g of the above-described nonaqueous electrolytic solution was poured into the inner portion of the laminate film. Then, after pouring the nonaqueous electrolytic solution, the opening of the laminate film was closed by heat-sealing, etc. of the resin layers of the laminate film with each other to form the battery (single cell).

In addition, in the verifications, the upper limit value Vmax of the voltage range imposed on the battery was set to 3.0 V, and the lower limit value Vmin of the voltage range imposed on the battery was set to 1.5 V. In the verifications, taking the following charging and discharging as one cycle, cycling tests were performed in an environment of 25° C. In the charging of the cycling tests, after performing the above-described charging in the constant current mode, the charging in the constant current mode was switched to the above-described charging in the constant voltage mode based on the voltage V(t) increasing to the reference voltage value Vc. Then, a single charging was terminated based on the current I(t) decreasing to the termination current value Ie in the constant voltage mode. The reference current value Ic as a charging rate in the constant current mode was set to 1.0 C (1.0 A). In addition, the reference voltage value Vc was set to 3.0 V as the above-described upper limit value Vmax of the use range, and the termination current value Ie was set to 0.05 C. In discharging of the cycling tests, discharging from the battery was performed in the constant current mode in which the current I(t) is held constant over time. Then, a single discharging was terminated based on the voltage V(t) dropping to the discharging termination voltage value Ve in the constant current mode. A discharging rate in the constant current mode was set to 1.0 C (1.0 A), and the discharging termination voltage value Ve was set to 1.5 V as the above-described lower limit value Vmin of the use range. In the cycling tests, the above-described charging and discharging were repeated. In addition, in the cycling tests, assuming that the battery was disposed in the inner portion of the housing, the battery was restrained by an aluminum plate in a state in which an external force to suppress an expansion is applied.

In a first example, in the above-described cycling test, processing similar to that shown in the examples of FIGS. 3 to 5 was performed to determine whether the battery was usable or unusable. In the first example, the above-described voltage threshold value ΔVth in the determination process in the constant current mode was set based on the difference value (Vmax−Vmin) between the upper limit value Vmax (same as the reference voltage value Vc in the present verifications) and the lower limit value Vmin (same as the discharging termination voltage value Ve in the present verifications) of the voltage range, and was set to 0.03 V, which is 1/50 of the difference value of 1.5 V. In addition, the above-described current threshold value ΔIth in the determination process in the constant voltage mode was set based on the rated current value, and was set to 0.12 C, which is 3/25 of the rated current value of 1 C. The above-described time threshold value (first time threshold value) Yath in the determination process in the constant current mode was set to 3 minutes, and the above-described time threshold value (second time threshold value) Ybth in the determination process in the constant voltage mode was set to 3 minutes. The count number threshold value ηth was set to 4.

In the cycling test, the current I(t) increased by 0.104 C in charging in the constant voltage mode in the 343th cycle, and the current I(t) increased by 0.072 C in charging in the constant voltage mode in the 422th cycle. Then, in both of the 343th cycle and the 422th cycle, before the time threshold value Ybth passed from a starting time of increasing, the current I(t) dropped again to the current value Ia at the starting time of increasing. In the cycling test, the voltage V(t) dropped by 0.0105 V in charging in the constant current mode in the 458th cycle, and in the 458th cycle, the voltage V(t) increased again to the voltage value Va at the starting time of dropping before the time threshold value Yath had passed from the starting time of dropping. In the cycling test, the current I(t) increased by 0.122 C in charging in the constant voltage mode in the 466th cycle. Accordingly, the current I(t) increased by the current threshold value ΔIth (0.12 C) or more from the starting time of increasing in charging in the constant voltage mode in the 466th cycle. In the 466th cycle, the count number η became the count number threshold value ηth (4). Thus, in the first example, in the 466th cycle, it was determined that the battery 2 was unusable, and use of the battery 2 was finished.

On the other hand, in determination of a first comparative example, it was determined that the battery 2 was unusable at a point in time at which any one of a drop in voltage V(t) in charging in the constant current mode and an increase in current I(t) in charging in the constant voltage mode first occurred. Thus, in the first comparative example, in a case where the cycling test was performed as described above, in the 343th cycle, it was determined that the battery 2 was unusable, and use of the battery 2 was finished.

From the above, in the determination of the first example, as compared to the determination of the first comparative example, the battery was usable for a long period of time. Accordingly, it has been demonstrated that whether an abnormality making the battery unusable has occurred is properly determined by the determination process of the embodiment such as the processing shown in the examples of FIGS. 3 to 5 being performed. It has been demonstrated that, by the determination process of the embodiment being performed, it is possible to use the battery for a long period of time, and appropriately extend the life of the battery from the start to the end of use.

In at least one of the above-described embodiments and examples, in charging of the battery in each of the constant current mode and the constant power mode, it is determined that the battery is unusable based on the voltage of the battery dropping by the voltage threshold value or more from the starting time of dropping without increasing again to the voltage value at the starting time of dropping. Then, in charging of the battery in the constant voltage mode, it is determined that the battery is unusable based on the current supplied to the battery increasing by the current threshold value or more from the starting time of increasing without dropping again to the current value at the starting time of increasing. Thereby, it is possible to provide a management method, a management device, a management system, a battery-mounted apparatus, and a non-transitory storage medium for properly determining whether an abnormality making the battery unusable has occurred based on temporal changes in current and voltage of the battery in charging of the battery.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management method of a battery in which an active material containing titanium is used as a negative electrode active material, comprising:

in charging of the battery in each of a constant current mode in which a current supplied to the battery is held constant over time and a constant power mode in which electric power supplied to the battery is held constant over time, determining that the battery is unusable based on a voltage of the battery dropping by a voltage threshold value or more from a starting time of dropping without increasing again to a voltage value at the starting time of dropping;

in charging of the battery in a constant voltage mode in which the voltage of the battery is held constant over time, determining that the battery is unusable based on the current supplied to the battery increasing by a current threshold value or more from a starting time of increasing without dropping again to a current value at the starting time of increasing, in the charging of the battery in each of the constant current mode and the constant power mode, determining that the battery is unusable based on a first time threshold value or more having passed from the starting time of dropping of the voltage of the battery without the voltage increasing again to the voltage value at the starting time of dropping;

in the charging of the battery in the constant voltage mode, determining that the battery is unusable based on a second time threshold value or more having passed from the starting time of increasing of the current supplied to the battery without the current dropping again to the current value at the starting time of increasing, determining that the battery is unusable based on a count number as a sum of a first number of times and a second number of times becoming a count number threshold value or more, the first number of times being a number of times the voltage increases again to the voltage value at the starting time of dropping before the first time threshold value passes from the starting time of dropping without dropping by the voltage threshold value or more from the starting time of dropping in the charging of the battery in each of the constant current mode and the constant power mode, and the second number of times being a number of times the current drops again to the current value at the starting time of increasing before the second time threshold value passes from the starting time of increasing without increasing by the current threshold value or more from the starting time of increasing in the charging of the battery in the constant voltage mode, wherein the count number threshold is a natural number of 2 or more.

2. The management method according to claim 1, further comprising performing at least one of a forced stopping of charging of the battery and notification that the battery is unusable when it is determined that the battery is unusable.

3. The management method according to claim 1, further comprising charging the battery by switching from the constant current mode or the constant power mode to the constant voltage mode after charging the battery in the constant current mode or the constant power mode from a starting time of charging as long as it is determined that the battery is usable.

4. The management method according to claim 3, further comprising:
   in the charging of the battery in the constant current mode or the constant power mode, switching to the constant voltage mode based on the voltage of the battery increasing to a reference voltage value; and
   in the charging of the battery in the constant voltage mode, terminating the charging based on the current supplied to the battery dropping to a termination current value.

5. A management device configured to manage a battery in which an active material containing titanium is used as a negative electrode active material, comprising a controller configured to:
   in charging of the battery in each of a constant current mode in which a current supplied to the battery is held constant over time and a constant power mode in which electric power supplied to the battery is held constant over time, determine that the battery is unusable based on the voltage of the battery dropping by a voltage threshold value or more from a starting time of dropping without increasing again to a voltage value at the starting time of dropping;
   in charging of the battery in a constant voltage mode in which the voltage of the battery is held constant over time, determine that the battery is unusable based on the current supplied to the battery increasing by a current threshold value or more from a starting time of increasing without dropping again to a current value at the starting time of increasing,
   in the charging of the battery in each of the constant current mode and the constant power mode, determine that the battery is unusable based on a first time threshold value or more having passed from the starting time of dropping of the voltage of the battery without the voltage increasing again to the voltage value at the starting time of dropping;
   in the charging of the battery in the constant voltage mode, determine that the battery is unusable based on a second time threshold value or more having passed from the starting time of increasing of the current supplied to the battery without the current dropping again to the current value at the starting time of increasing,
   determine that the battery is unusable based on a count number as a sum of a first number of times and a second number of times becoming a count number threshold value or more, the first number of times being a number of times the voltage increases again to the voltage value at the starting time of dropping before the first time threshold value passes from the starting time of dropping without dropping by the voltage threshold value or more from the starting time of dropping in the charging of the battery in each of the constant current mode and the constant power mode, and the second number of times being a number of times the current drops again to the current value at the starting time of increasing before the second time threshold value passes from the starting time of increasing without increasing by the current threshold value or more from the starting time of increasing in the charging of the battery in the constant voltage mode, wherein the count number threshold is a natural number of 2 or more.

6. A management system comprising:
   the management device according to claim 5; and
   the battery in which the active material containing titanium is used as a negative electrode active material, wherein determination as to whether the battery is usable is performed by the controller of the management device.

7. The management system according to claim 6, further comprising a battery-mounted apparatus in which the battery is mounted.

8. A battery-mounted apparatus comprising:
   the management device according to claim 5; and
   the battery in which the active material containing titanium is used as a negative electrode active material, wherein determination as to whether the battery is usable is performed by the controller of the management device.

9. A non-transitory storage medium storing a management program for managing a battery in which an active material containing titanium is used as a negative electrode active material, wherein the management program causes a computer to:
   in charging of the battery in each of a constant current mode in which a current supplied to the battery is held constant over time and a constant power mode in which electric power supplied to the battery is held constant over time, determine that the battery is unusable based on the voltage of the battery dropping by a voltage threshold value or more from a starting time of dropping without increasing again to a voltage value at the starting time of dropping; and
   in charging of the battery in a constant voltage mode in which the voltage of the battery is held constant over time, determine that the battery is unusable based on the current supplied to the battery increasing by a current threshold value or more from a starting time of increasing without dropping again to a current value at the starting time of increasing, in the charging of the battery in each of the constant current mode and the constant power mode, determine that the battery is unusable based on a first time threshold value or more having passed from the starting time of dropping of the voltage of the battery without the voltage increasing again to the voltage value at the starting time of dropping;

in the charging of the battery in the constant voltage mode, determine that the battery is unusable based on a second time threshold value or more having passed from the starting time of increasing of the current supplied to the battery without the current dropping again to the current value at the starting time of increasing, determine that the battery is unusable based on a count number as a sum of a first number of times and a second number of times becoming a count number threshold value or more, the first number of times being a number of times the voltage increases again to the voltage value at the starting time of dropping before the first time threshold value passes from the starting time of dropping without dropping by the voltage threshold value or more from the starting time of dropping in the charging of the battery in each of the constant current mode and the constant power mode, and the second number of times being a number of times the current drops again to the current value at the starting time of increasing before the second time threshold value passes from the starting time of increasing without increasing by the current threshold value or more from the starting time of increasing in the charging of the battery in the constant voltage mode, wherein the count number threshold is a natural number of 2 or more.

* * * * *